(12) United States Patent
San Martin et al.

(10) Patent No.: US 10,203,193 B2
(45) Date of Patent: *Feb. 12, 2019

(54) APPARATUS AND METHODS TO FIND A POSITION IN AN UNDERGROUND FORMATION

(71) Applicant: Halliburton Energy Services, Inc., Houston, TX (US)

(72) Inventors: Luis Emilio San Martin, Houston, TX (US); Baris Guner, Kingwood, TX (US); Burkay Donderici, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 316 days.

This patent is subject to a terminal disclaimer.

(21) Appl. No.: 14/753,910

(22) Filed: Jun. 29, 2015

(65) Prior Publication Data

US 2015/0300158 A1 Oct. 22, 2015

Related U.S. Application Data

(63) Continuation of application No. 14/649,720, filed as application No. PCT/US2012/072326 on Dec. 31, 2012.

(51) Int. Cl.
*G01V 3/26* (2006.01)
*G01B 7/00* (2006.01)
(Continued)

(52) U.S. Cl.
CPC ............... *G01B 7/00* (2013.01); *G01B 7/003* (2013.01); *G01S 13/878* (2013.01); *G01S 13/885* (2013.01); *G01V 3/26* (2013.01)

(58) Field of Classification Search
CPC ..... G01V 3/26; G01V 3/38; G01V 3/30; G01V 3/28; G01V 3/081; G01V 3/20;
(Continued)

(56) References Cited

U.S. PATENT DOCUMENTS 4,875,014 A 10/1989 Roberts et al.
6,435,286 B1 8/2002 Stump et al.
(Continued)

FOREIGN PATENT DOCUMENTS

WO WO-2007/075553 A2 7/2007
WO WO-2012030327 A1 3/2012
(Continued)

OTHER PUBLICATIONS

"U.S. Appl. No. 14/649,720, Preliminary Amendment filed Jun. 4, 2015", 14 pgs.
(Continued)

*Primary Examiner* — Jermele M Hollington
*Assistant Examiner* — Taqi Nasir
(74) *Attorney, Agent, or Firm* — Gilliam IP PLLC

(57) ABSTRACT

Various embodiments include apparatus and methods related to finding a position in an underground formation. Apparatus and methods can include receiving signals from a receiver in an underground formation in response to signals generated from transmitting sources, each of the transmitting sources located at a known position; and processing the received signals, based on the signals generated from the transmitting sources, to determine the position of the receiver. A number of techniques can be applied to processing the received signal. Additional apparatus, systems, and methods are disclosed.

36 Claims, 16 Drawing Sheets

(51) Int. Cl.
*G01S 13/87* (2006.01)
*G01S 13/88* (2006.01)

(58) Field of Classification Search
CPC . G01V 3/08; G01V 3/15; G01V 3/165; G01V 13/00; G01V 3/18
USPC ........... 324/324, 333, 338, 326, 346–355, 324/368–372, 221, 202
See application file for complete search history.

(56) References Cited

U.S. PATENT DOCUMENTS

| | | | |
|---|---|---|---|
| 6,643,589 B2 | 11/2003 | Zhang et al. | |
| 7,686,099 B2 | 3/2010 | Rodney | |
| 8,200,437 B2 | 6/2012 | Davydycheva et al. | |
| 2005/0077085 A1 | 4/2005 | Zeller et al. | |
| 2005/0088180 A1* | 4/2005 | Flanagan | G01V 3/30 324/338 |
| 2005/0088181 A1* | 4/2005 | Barber | G01V 3/28 324/346 |
| 2007/0145980 A1 | 6/2007 | Conti et al. | |
| 2007/0176842 A1* | 8/2007 | Brune | H01Q 1/04 343/866 |
| 2007/0177133 A1* | 8/2007 | Cain | E02F 3/437 356/139.04 |
| 2008/0036652 A1* | 2/2008 | Shore | E21B 47/02224 342/357.31 |
| 2008/0122444 A1 | 5/2008 | Schaug-Pettersen et al. | |
| 2008/0281667 A1* | 11/2008 | Chen | G01V 3/30 73/152.02 |
| 2009/0083006 A1* | 3/2009 | Mackie | G01V 11/00 703/1 |
| 2009/0171587 A1* | 7/2009 | Lu | G01V 3/083 702/7 |
| 2010/0219835 A1* | 9/2010 | Wentworth | E21B 7/04 324/346 |
| 2010/0259267 A1 | 10/2010 | Rosthal et al. | |
| 2010/0259268 A1 | 10/2010 | Zhang et al. | |
| 2011/0050232 A1* | 3/2011 | Wilt | G01V 3/30 324/334 |
| 2011/0062959 A1* | 3/2011 | Zeller | E21B 47/02224 324/326 |
| 2011/0068798 A1 | 3/2011 | Minerbo et al. | |
| 2011/0156957 A1 | 6/2011 | Waite | |
| 2011/0285590 A1 | 11/2011 | Wellington | |
| 2013/0335272 A1 | 12/2013 | Belloni et al. | |
| 2014/0012505 A1 | 1/2014 | Smith | |
| 2015/0301215 A1 | 10/2015 | San Martin et al. | |
| 2015/0369951 A1 | 12/2015 | San Martin et al. | |

FOREIGN PATENT DOCUMENTS

| | | |
|---|---|---|
| WO | 2012064342 A1 | 5/2012 |
| WO | WO-2014105087 A1 | 7/2014 |

OTHER PUBLICATIONS

"International Application Serial No. PCT/US2012/072326, International Search Report Nov. 1, 2013", 4 pgs.
"International Application Serial No. PCT/US2012/072326, Invitation to Pay Additional Fees and Partial Search Report dated Sep. 4, 2013", 7 pgs.
"International Application Serial No. PCT/US2012/072326, Written Opinion dated Nov. 1, 2013", 14 pgs.
"Australian Application Serial No. 2012397815, First Examiner Report dated Mar. 10, 2016", 4 pgs.
"Australian Application Serial No. 2012397815, Response filed Jul. 6, 2016 to First Examiner Report dated Mar. 10, 2016", 32 pgs.
"Australian Application Serial No. 2012397815, Subsequent Examiners Report dated Jul. 27, 2016", 3 pgs.
"European Application Serial No. 12890872.0, Response filed Jan. 20, 2016 to Office Action dated Jul. 29, 2015", 25 pgs.
"European Application Serial No. 12890872.0, Supplementary Partial European Search dated May 27, 2016", 7 pgs.
"European Application Serial No. 16150827.0, Partial European Search Report dated May 30, 2016", 6 pgs.
"European Application Serial No. 16150828.8, Extended European Search Report dated May 30, 2016", 7 pgs.
"International Application Serial No. PCT/US2012/072326, International Preliminary Report on Patentability dated Jul. 9, 2015", 16 pgs.
"Malaysian Application Serial No. PI2015001483, Preliminary Examination dated Jun. 24, 2015", 3 pgs.
"Canadian Application Serial No. 2,893,747, Office Action dated Sep. 28, 2016.", 4 pages.
"Chinese Application Serial No. 201280077520.1, First Office Action dated Aug. 18, 2016.", 14 pages.
"European Application Serial No. 12890872.0, Extended European Search Report dated Sep. 14, 2016", 12 pgs.
"European Application Serial No. 16150827.0, Extended European Search Report dated Oct. 13, 2016", 11 pgs.
"Russian Application Serial No. 2015122430; Office Action dated Aug. 24, 2016.", 6 pages.
"Examination Report No. 3", Australian Examination Report No. 3 serial No. 2016204732; dated Nov. 20, 2017, 3.
"Australian Application Serial No. 2016204732; First Examination Report dated Jul. 6, 2017.", 3 pages.
"Australian Application Serial No. 2016204732; Second Examination Report dated Sep. 21, 2017.", 3 pages.
"Australian Application Serial No. 2016204733; First Examination Report dated Jul. 6, 2017.", 3 pages.
"Canadian Application Serial No. 2,893,747, Second Office Action dated Oct. 3, 2017.", 8 pages.
"Chinese Application Serial No. 201280077520.1, Second Office Action, dated Jun. 20, 2017", 8 pages.
Australian Application Serial No. 2016204732; Examination Report #5; dated May 29, 2018, 5 pages.
Feng, et al., "AVO principles, processing and inversion", CREWES Research Report vol. 18 (2006). <url:https://web.archive.org/web/20090130042012/https://crewes.org/ForOurSponsors/ResearchReports/reports.php?year=2006 >.
Chinese Application Serial No. 201280077520.1; Chinese Office Action; dated Mar. 19, 2018, 11 pages.

* cited by examiner

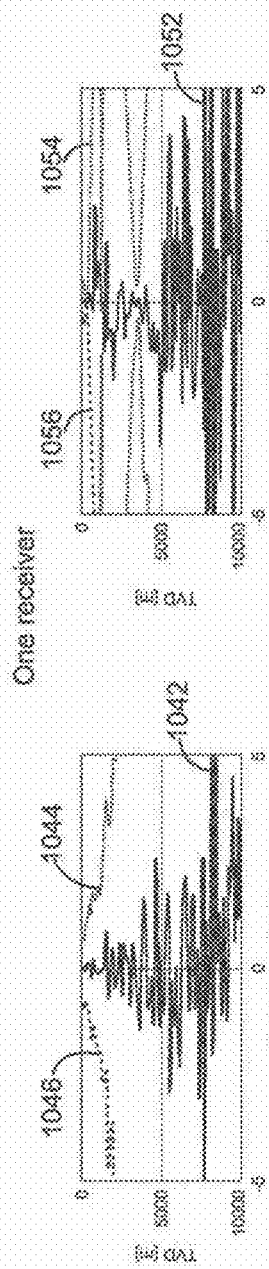

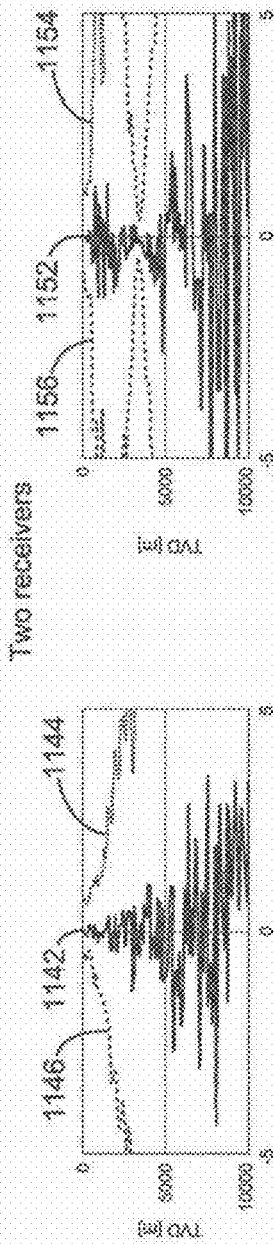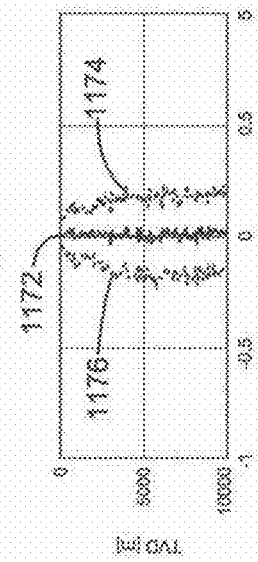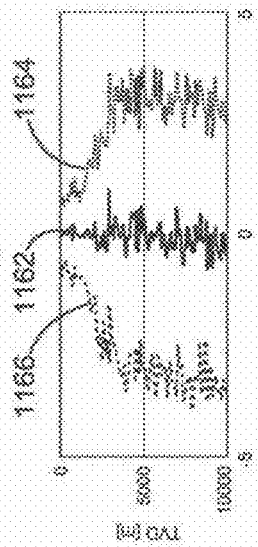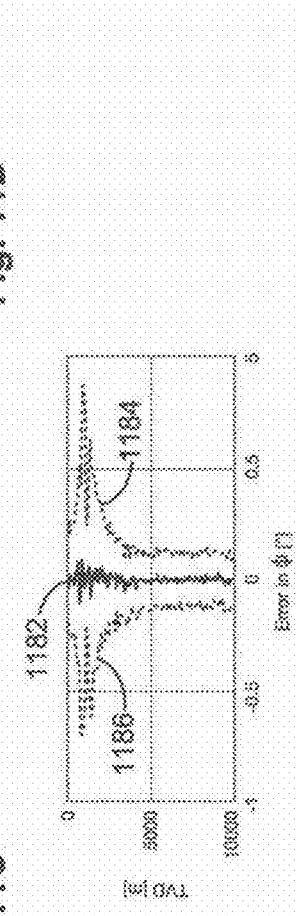

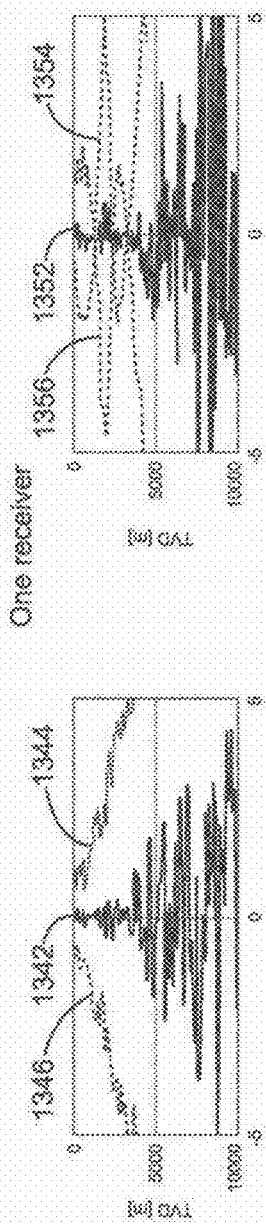
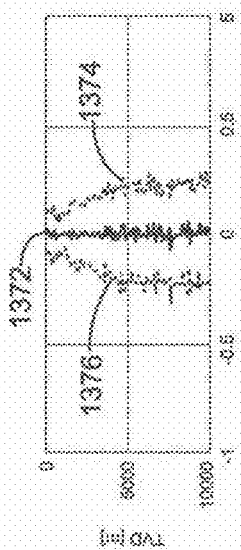
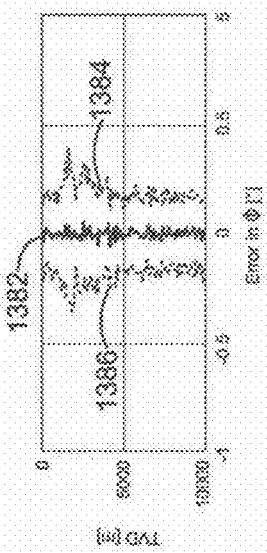
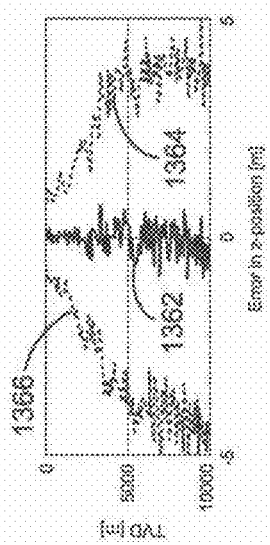
Fig. 13A  Fig. 13B  Fig. 13C  Fig. 13D  Fig. 13E

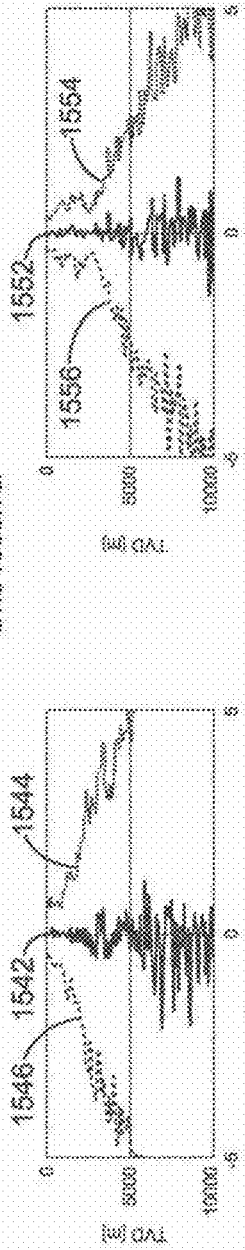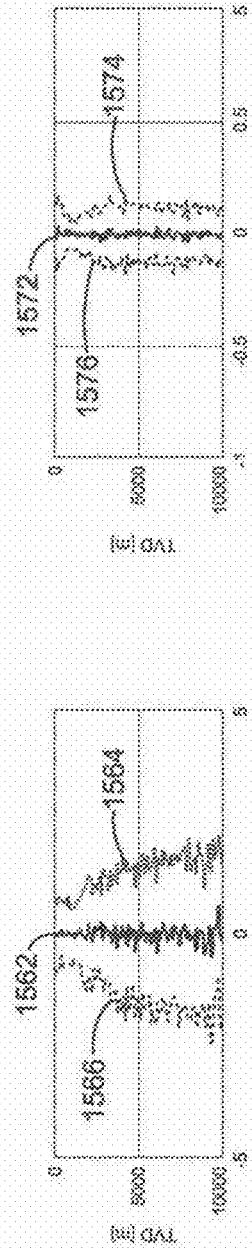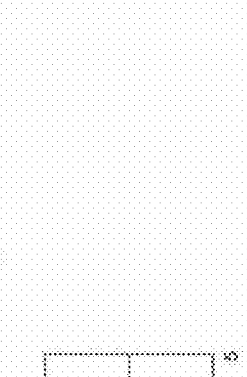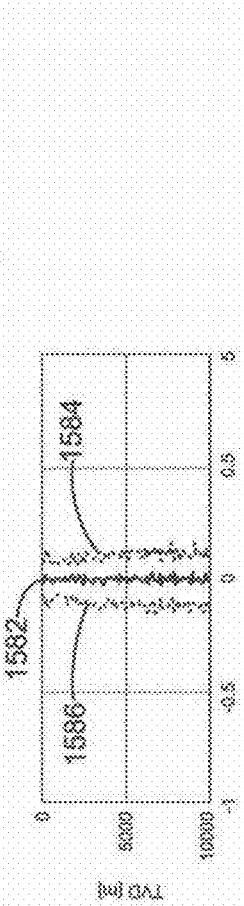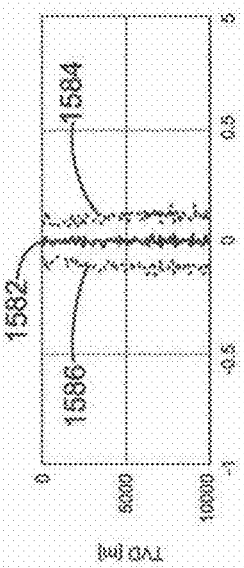

APPARATUS AND METHODS TO FIND A POSITION IN AN UNDERGROUND FORMATION

PRIORITY APPLICATIONS

This application is a continuation application of U.S. patent application Ser. No. 14/649,720, filed 4 Jun. 2015; which application is a U.S. National Stage Filing under 35 U.S.C. 371 from International Application No. PCT/US2012/072326, filed on 31 Dec. 2012, and published as WO 2014/105087 A1 on 3 Jul. 2014, which applications and publication are incorporated herein by reference in their entirety.

TECHNICAL FIELD

The present invention relates generally to apparatus and method for making measurements related to oil and gas exploration.

BACKGROUND

In drilling wells for oil and gas exploration, understanding the structure and properties of the associated geological formation provides information to aid such exploration. Data to provide the information may be obtained using sensors located in an underground formation at large distances from the surface. Knowing the position of these sensors in the underground formation can be used to formulate the information for exploration. Systems and techniques to determine the position of sensors in the underground formation can enhance the analysis process associated with a drilling operation.

BRIEF DESCRIPTION OF THE DRAWINGS

FIGS. 10A-E show results of a Monte Carlo simulation for the simulation geometry of FIG. 9, in accordance with various embodiments.

FIGS. 11A-E show results of a Monte Carlo simulation for the positioning system of FIG. 9 where a second receiver is used, whose position is constrained with respect to a first receiver, in accordance with various embodiments.

FIGS. 13A-E show results of a Monte Carlo simulation for the positioning system of FIG. 12, in accordance with various embodiments.

FIGS. 15A-E shows results of a Monte Carlo simulation for the positioning system of FIG. 14, in accordance with various embodiments.

DETAILED DESCRIPTION

Figure 1:
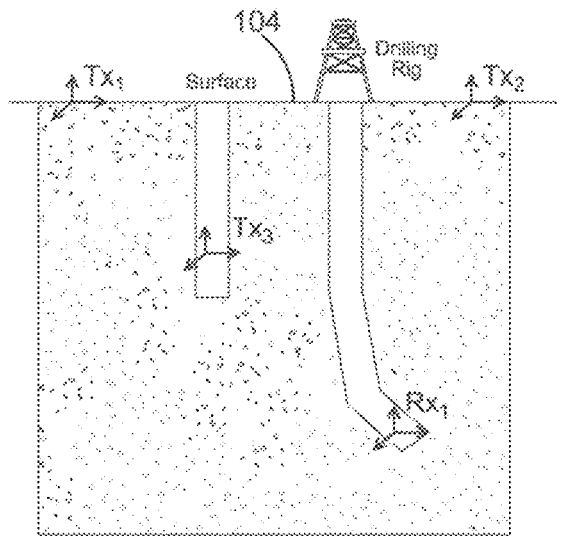
FIG. 1 shows an example placement of transmitters and a receiver, which placement can be used to determine the position of the receiver, in accordance with various embodiments.

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

In various embodiments, systems and methods to find the position of an underground receiver can include locating the position of the receiver, or receivers, from measurements taken by the receivers and the known positions of the sources that generate the signals for the measurements. Sources can be used that are placed at known positions either at the surface or below the surface of the earth with the receiver or receivers located underground. The position of underground receiver(s) from the measurements of the signals, generated by a number of transmitting sources whose positions are known precisely, may be determined.

Electromagnetic type transmitting sources and receivers can be used in systems to determine a position underground. Such transmitting sources can include, but are not limited to, dipole transmitters, sources generating large distribution of current aboveground or near ground that generate electromagnetic fields below ground, where the electromagnetic fields measurable at the receiver, or other sources that can generate a signal measurable at a receiver deep in an underground formation. Dipoles of sources can be oriented in a direction perpendicular to the area of interest, where the area of interest includes a receiving source to be located. This orientation can account for a null point along the direction of the dipole. Transmitting sources can be realized by one or more triad transmitters. A triad transmitter is a structure having three transmitting sources at the same location, where the position or orientation of the three transmitting sources is different from each other. The three transmitting sources of the triad can be mounted on the same structure at a given location. Transmitting sources aboveground or near ground can be operated to generate signals having a low frequency to penetrate deeply underground such that the signals are measurable in an underground volume extending from a hundred feet to thousands feet in depth and from a hundred feet to thousands of feet across the depth. Alternatively, other types of transmitters used in oilfield exploration industry, such as, but not limited to, acoustic sensors and seismic sensors, can be used in systems to determine a position underground. The number of transmitting sources may include three or more transmitting sources. In an embodiment, three transmitting sources can be realized by a single triad transmitter.

The receiver or receivers can be controlled by electronics disposed underground. In addition, a processing unit can be located downhole to analysis the signals received by the receiver. The processing unit can be realized by electronics integrated with the receiver, where the information concerning the known locations of the transmitting sensors is stored with the electronics along with instructions to process the signals. The processing unit can be realized by electronics disposed on the structure on which the receiver is disposed and separated from the receiver. The processing unit and receiver control located downhole can allow for automated geosteering. Alternatively, the processing unit can be located at the surface, responsive to receiving the signals or data regarding the signals from the receiver.

FIG. 1 shows an example embodiment of placement of transmitters and a receiver, which placement can be used to determine the position of the receiver. In FIG. 1, three transmitters, denoted as $Tx_1$, $Tx_2$, and $Tx_3$, are illustrated, as an example, in different locations with respect to a receiving sensor, $Rx_1$. $Tx_1$ and $Tx_2$ are on surface 104, while $Tx_3$ is underground inside a well different from the one in which $Rx_1$ is disposed. This figure is a 2-dimensional (2D) figure, shown for illustration purposes, in which the transmitters line in the same plane. In various embodiments, transmitting sources used to locate the position of a receiving sensor lie in a plane common to no more than two transmitters and the receiver sensor. With the transmitting sensors satisfying this condition, better resolution can be obtained in the received signals in a measurement process. In addition, the number of transmitters, the number or receivers, or the number of transmitters and receivers can be increased to improve resolution.

The number of transmitters and transmitter locations can also be optimized using known optimization techniques, depending on the application. However, in the discussion of embodiments, the effects of the number of transmitters and their locations are analyzed using numerical modeling results. Receiver sensors and transmitters were selected to be triads antennas, as illustrated in FIG. 1, in simulations to improve inversion accuracy, although that is not necessary for the operation of embodiments of methods to determine a position in an underground formation. As shown in FIG. 1, transmitting sources $Tx_1$, $Tx_2$, and $Tx_3$ structured as three triads can provide 9 transmitting sources at three locations, with 9 positions or orientations. Receiving sensor, $Rx_1$, can also be structured as a triad receiving sensor having three receivers at one location with three positions or orientations.

Increasing the number of transmitting sources with each transmitting source at a known location can increase the amount of information used to determine the position of a receiver or receivers in underground formations. In addition, the transmitting sources are not limited to using the same type of transmitting source. For example, arrangements can include two triad transmitters among three or more transmitters distributed over a significantly large region. Other arrangements can include a transmitting source structured as a circuit distributed over a significantly large region on the surface or near the surface. The circuit can include a closed loop having a current-carrying wire, where the current-carrying wire is at a known position and the current-carrying wire is arranged along a straight-line path such that signals received at the receiver from the closed loop are negligible from portions of the closed loop that follow a path different from the straight-line path. The signal at the receiver can be primarily provided by this single current-carrying wire with the other portions of the circuit that close the loop located at such distances from the receiver that signals from these other portions are effectively attenuated prior to the receiver. Alternatively, a transmitting source can be structured as a circuit having a closed loop with a number of current-carrying wires with each current-carrying wire being at a known position and arranged along a straight-line path such that signals received at the receiver from the closed loop are negligible from portions of the closed loop that follow a path different from these respective straight-line paths. The received signals at the receiver can be processed based on a model of the number of current-carrying wires and their corresponding straight-line paths.

Low frequency electromagnetic waves can penetrate deeply below the surface of the earth. By using low frequency sources (f<10 Hz), the fields generated by the sources will be measurable at positions buried deeply underground. In an embodiment, low frequency sources having a frequency less than or equal to 50 Hz can be used. A receiver placed in a borehole under the surface can measure the signals generated by the sources. These signals from each one of the sources can be processed to find the distance, orientation, or both distance and orientation. In various embodiments, position determination at depths as large as 10,000 meters may be performed.

A first consideration includes the effect of frequency on the signals that penetrate the formation. As frequency increases, attenuation underground increases such that, at higher frequencies, attenuation is more severe and could reduce signals below the noise level. Another factor to consider is that higher frequencies are also more sensitive to the formation, which can significantly affect the received signal. That is, at higher frequencies, the solution for the position of a receiver(s) would be sensitive to the parameters of the complex and in most cases not accurately known formation information. Example embodiments of methods to determine a position underground can be performed under a single frequency operation. However, in other embodiments, features of methods to determine a position underground can be performed under a multi-frequency operation.

Figure 2:
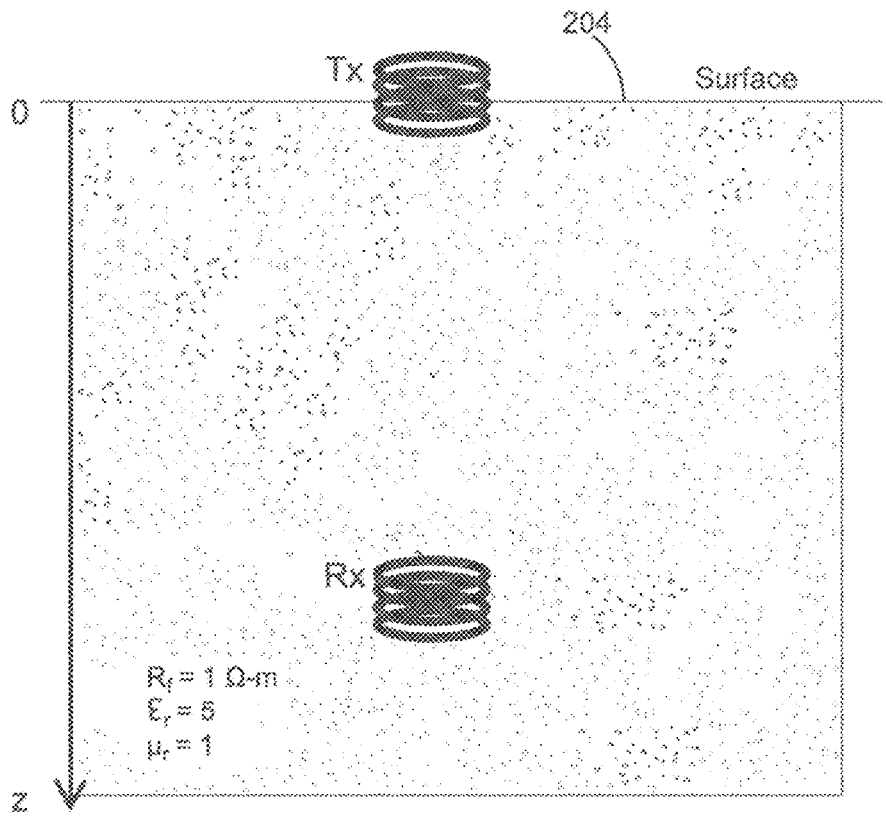
FIG. 2 shows a simulation setup for the analysis of the effect of frequency, in accordance with various embodiments.

FIG. 2 shows a simulation setup for the analysis of the effect of frequency. To analyze the effect of frequency, the variation of the signal level with depth is computed as a function of frequency when a single transmitter is present. Transmitter and receiving sensor were simulated as coil antennas with their normal parallel to the radial direction of earth. Henceforth, the axis normal to the surface of earth will be denoted as z-axis. With this convention, the simulated case shows the ZZ-coupling. Other orthogonal components (XX-coupling and YY-coupling) show similar characteristics and are not shown.

In this simulation, receiving sensor Rx is directly below the transmitter Tx. For illustration purposes, both the receiver and transmitter coils are assumed to have a unit area with 400 turns each and the transmitter is assumed to carry 25 A current. Design parameters can vary as dictated by engineering concerns for a given application. However, to be able to transmit signal to such great depths, transmitted power level should be high and the receiving sensor structured as a highly sensitive receiver. This concern for power level may also make putting transmitters on the surface 204 more practical than cases where some or all of the transmitters are under ground. Formation parameters used in the simulation are also shown in FIG. 2. A somewhat worst-case scenario with a conductive formation of resistivity, $R_f$, equal to 1 Ω-m was considered. Relative permittivity ($\varepsilon_r$) and permeability ($\mu_r$) were selected as 5 and 1, respectively.

Figures 3A, 3B:
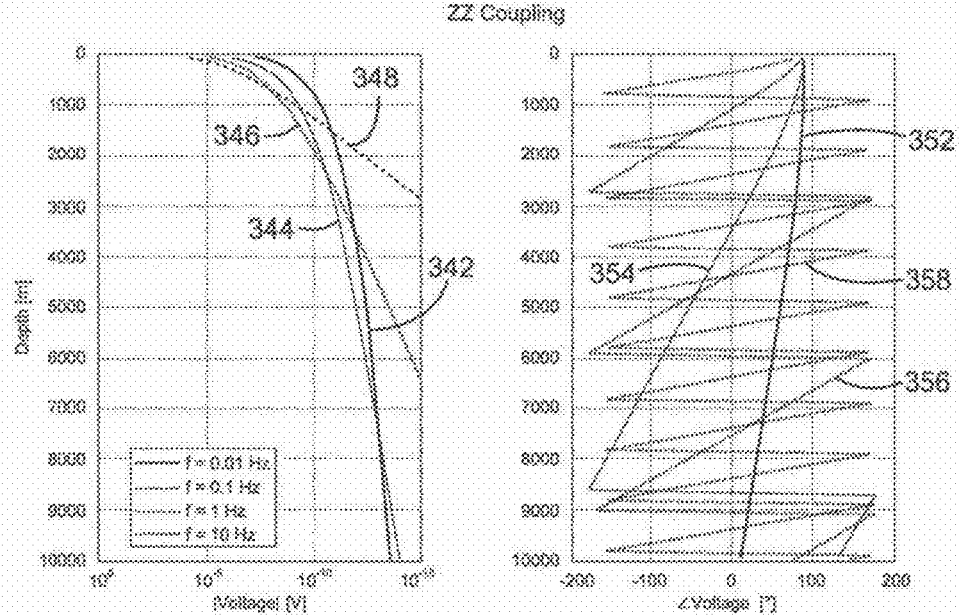
FIGS. 3A-B show depth vs. voltage levels of received signals for different frequencies for the simulation setup of FIG. 2, in accordance with various embodiments.

FIGS. 3A-B show depth vs. voltage levels of received signals for different frequencies for the simulation setup of FIG. 2. FIG. 3A shows the change of the absolute value of the voltage with depth for four different frequencies, and FIG. 3B shows the change of the phase of the voltage with depth for the four different frequencies. Curves 342, 344, 346, and 348 show depth as a function of the absolute value of voltage at frequencies of 0.01 Hz, 0.1 Hz, 1 Hz, and 10 Hz, respectively. Curves 352, 354, 356, and 358 show depth as a function of the phase of the voltage at frequencies of 0.01 Hz, 0.1 Hz, 1 Hz, and 10 Hz, respectively. For 1 Hz and 10 Hz, signal quickly attenuates. Wrap around in the phase can also be seen which can make the inversion difficult. In comparison, as the frequency gets lower, signal attenuation becomes less of a problem. However, for these lower frequencies, initial strength of the signal is already low. Thus, even for 0.01 Hz and 0.1 Hz, the voltage level goes to as low as 10 femtoVolts at 10,000 m for the simulated transmitter and receiver configurations. Results suggest that for the parameters used there is little improvement in attenuation for frequencies lower than 0.1 Hz. Thus, in other simulations discussed herein, the frequency of operation was assumed to be 0.1 Hz.

Figures 4A, 4B:
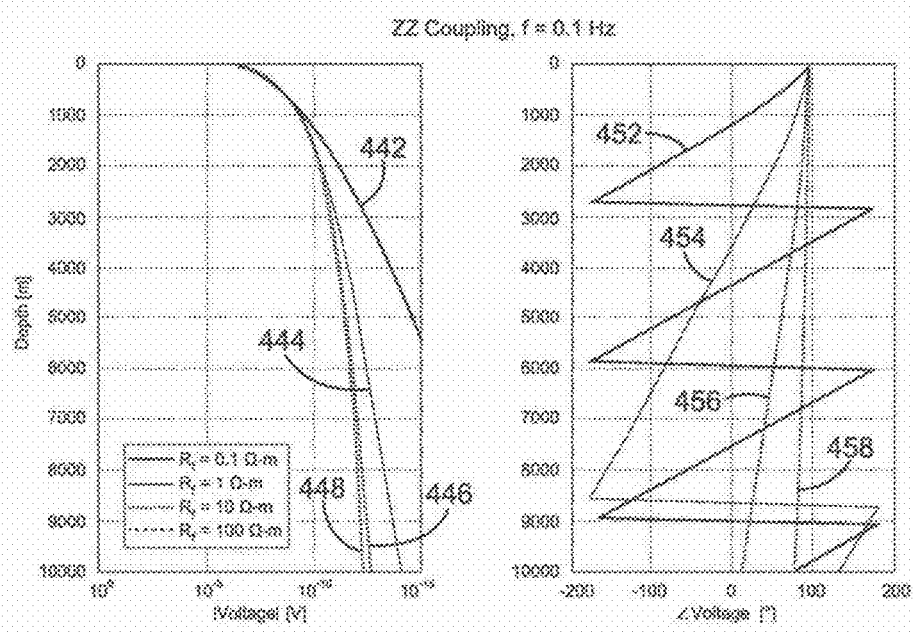
FIGS. 4A-B show depth vs. voltage levels of received signals for varying formation resistivities at a fixed operation frequency for the simulation setup of FIG. 2, in accordance with various embodiments.

FIGS. 4A-B show depth vs. voltage levels of received signals for varying formation resistivities at a fixed operation frequency. To analyze the effect of formation resistivity, the same setup shown in FIG. 2 was used with the frequency set to a constant 0.1 Hz and the formation resistivity varied between 0.1 Ω-m to 100 Ω-m. Curves 442, 444, 446, and 448 show depth as a function of the absolute value of voltage at formation resistivities of 0.1 Ω-m, 1 Ω-m, 10 Ω-m, and 100 Ω-m, respectively. Curves 452, 454, 456, and 458 show depth as a function of the phase of the voltage at formation resistivities of 0.1 Ω-m, 1 Ω-m, 10 Ω-m, and 100 Ω-m, respectively. Effect of formation resistivity on the received signal can be seen to be small except for extremely conductive formations. Thus, this effect can be neglected, or it can be eliminated using a basic correction scheme. Nevertheless, for examples discussed herein, formation resistivity was assumed to be exactly known.

Figures 5A, 5B:
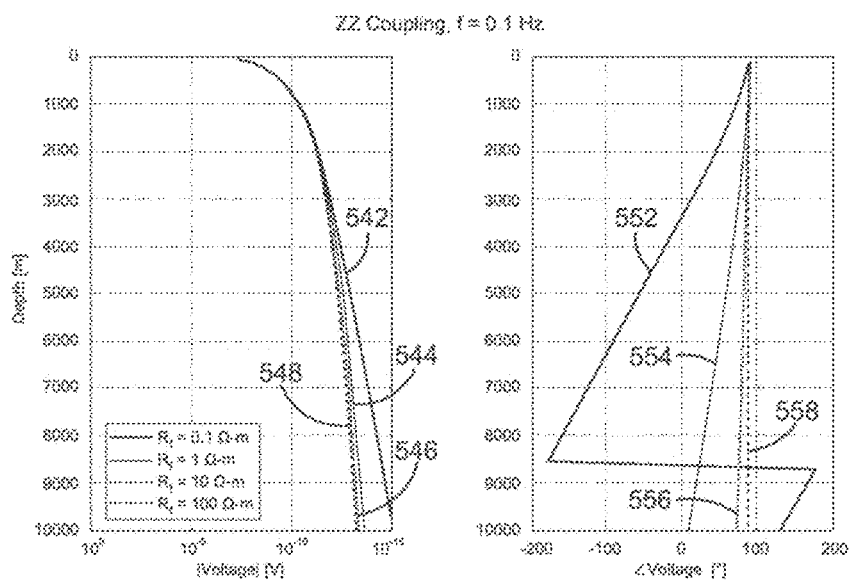
FIGS. 5A-B show depth vs. voltage levels of received signals for varying formation resistivities at another fixed operation frequency for the simulation setup of FIG. 2, in accordance with various embodiments.

FIGS. 5A-B show depth vs. voltage levels of received signals for varying formation resistivities at another fixed operation frequency, in accordance with various embodiments. The same setup shown in FIG. 2 was used with the frequency set to a constant 0.01 Hz and the formation resistivity varied between 0.1 Ω-m to 100 Ω-m. Curves 542, 544, 546, and 548 show depth as a function of the absolute value of voltage at formation resistivities of 0.1 Ω-m, 1 Ω-m, 10 Ω-m, and 100 Ω-m, respectively. Curves 546 and 548 overlap such that the differences are not discernible at the scales of FIG. 5A. Curves 552, 554, 556, and 558 show depth as a function of the phase of the voltage at formation resistivities of 0.1 Ω-m, 1 Ω-m, 10 Ω-m, and 100 Ω-m, respectively. Results for 0.01 Hz shown in FIG. 5 exhibit very little dependence on the formation resistivity for the depth range considered. However, such a low frequency may cause difficulties in an implementation of the system hardware.

Figure 6:
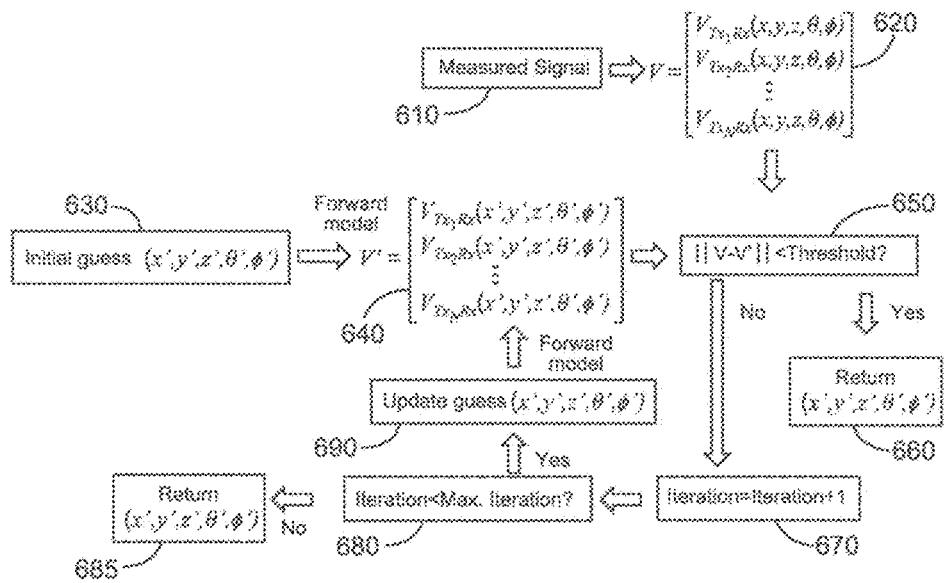
FIG. 6 shows features of an example inversion scheme to determine the position of a receiver in an underground formation, in accordance with various embodiments.

FIG. 6 shows features of an example inversion scheme to determine the position of a receiver in an underground formation. This inversion scheme demonstrates how the position of the receiving sensor may be determined using an array of transmitters at previously known locations. At 610, the measurement of signals due to N different transmitters at the receiver is acquired. These signals are combined into a column vector, denoted as V, at 620. Although a single receiver relative to N transmitters is discussed at 610 and 620, more complicated measurements can be considered in a similar or identical manner. For example, if receivers or transmitters are multi-component, each individual entry ($V_{TxRx}$) becomes a vector with individual components as the element of the vector. Examples of such receivers and transmitters include triad receivers and triad transmitters. If there are multiple frequencies, results of these measurements may be appended to the measurement vector and so on. Once this voltage is obtained, it may be further processed depending on the application. For example, if signal from one of the transmitters is too strong compared to the others, amplitudes of received signal from different transmitters may be normalized to ascertain that weight of each transmitter in the inversion is same.

In the inversion scheme, the determination of the position and the direction of the receiving sensor(s) is the object of interest. Thus, parameters of interest are denoted as the location of the receiver sensor (x, y, z), its azimuth (θ), and its elevation angle (ϕ). At 630, an initial guess of the location and direction parameters (x', y', z', θ', ϕ') is made. The signal corresponding to an initial guess of the location and direction parameters (x', y', z', θ', ϕ') is simulated using a forward model, which is denoted as V' at 640. As in every inversion scheme, an accurate forward model that relates parameters to be inverted to the measured signal is used in this method.

At 650, the norm of the difference between V and V' is compared to a threshold. If the norm of the difference between V and V' is lower than a predetermined threshold, the processing may stop and the processed parameters (x', y', z', θ', φ') may be deemed to be accurate approximations to the true parameters (x, y, z, θ, φ), at 660. Other convergence criteria may also be applied in this step.

If convergence is not satisfied, an iteration number can be increased by one, at 670. To prevent, for example, infinite simulations for cases where no solution below the threshold is possible such as at highly noisy environments, or to restrict the simulation time, the number of iterations may be compared with a previously set maximum iteration number, at 680. If the maximum number of iterations is reached, the processing may stop with the latest guess, or a previous guess that minimized the error, returned as the answer, at 685. Otherwise, the parameter guess vector is updated at 690, V' is simulated again, at 640, based on this guess and the above process of comparing the process signal with the measured signal and subsequent comparisons can be repeated. The update of the guess vector may be based on the calculation of a gradient that minimizes the error.

Alternative inversion schemes may be used with equal success. Such inversion schemes can include using a lookup table. Another alternative inversion scheme can include applying a brute force search method that tries a large number of possible input combinations and selects the one that minimizes the error between the measured data and the forward model. Alternative inversion schemes are not limited to these alternatives, but may include other alternative inversion schemes or combinations thereof.

Figure 7:
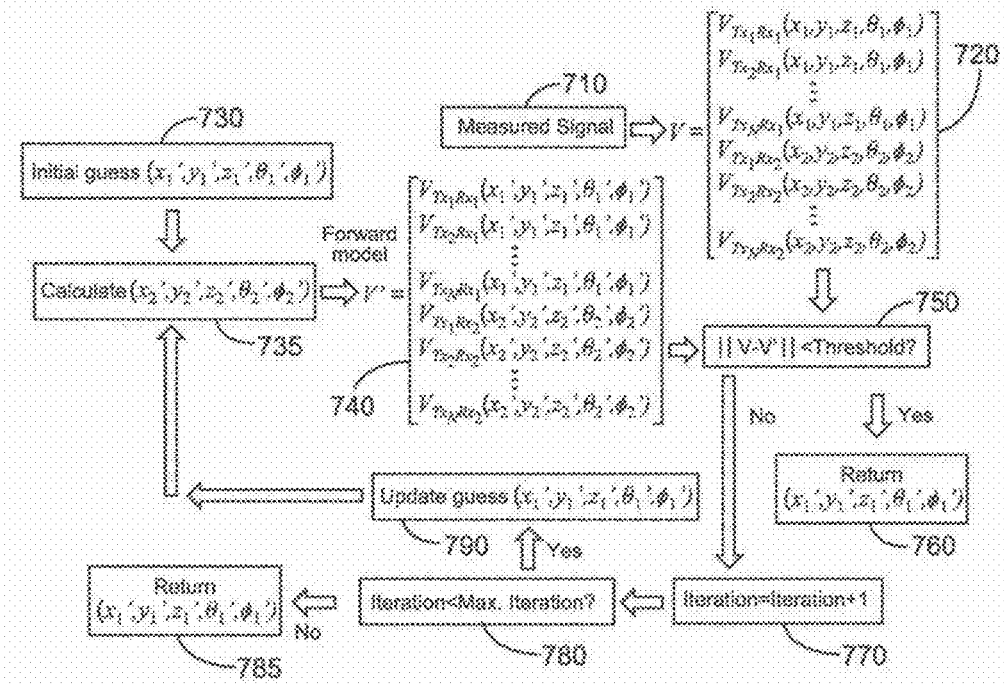
FIG. 7 shows features of an example of a constrained inversion scheme to determine the position of a receiver in an underground formation, in accordance with various embodiments.

FIG. 7 shows features of an example of a constrained inversion scheme to determine the position of a receiver in an underground formation, in accordance with various embodiments. A constraint may be applied as one of a number of different techniques may be employed to reduce the error in inversion. One such technique is the addition of a second sensor whose position relative to the first sensor is exactly known. Although these two sensors will have to be close to each other in the electrical sense, thus providing little independent information, the fact that the noise at separate sensors should be mostly independent will improve the inversion accuracy. Inversion in this case can be similar to the inversion with a single receiver associated with FIG. 6.

At 710, the measurement of signals due to N different transmitters at the two receivers is acquired. These signals are combined into a column vector, denoted as V, at 720, providing twice as many components as the measured signal in methods related to FIG. 6. These measured signals can be acquired and processed in a manner similar to the variations of processing measured signals with respect to FIG. 6.

In the inversion scheme, the determination of the position and the direction of the receiving sensor(s) is the object of interest. Thus, parameters of interest are denoted as the location of the receiver sensor (x, y, z), its azimuth (θ), and its elevation angle (φ). At 730, an initial guess for the position and orientation parameters (x', y', z', θ', φ') is made of one of the sensors. Since the exact location of the second sensor is known with respect to the first sensor, the guess for its position and orientation may be calculated based on the first guess, at 735. The signal corresponding to the initial guess of the location and direction parameters of the two receivers is simulated using a forward model, which is denoted as V' at 740. An accurate forward model, which relates parameters to be inverted to the measured signal, can be used in this method.

At 750, the norm of the difference between V and V' for the two receivers is compared to a threshold. If the norm of the difference between V and V' is lower than a predetermined threshold, the processing may stop and the processed parameters (x', y', z', θ', φ') may be deemed to be accurate approximations to the true parameters (x, y, z, θ, φ), at 760. Other convergence criteria may also be applied in this step.

If convergence is not satisfied, an iteration number can be increased by one, at 770. To prevent, for example, infinite simulations for cases where no solution below the threshold is possible such as at highly noisy environments, or to restrict the simulation time, the number of iterations may be compared with a previously set maximum iteration number, at 780. If the maximum number of iterations is reached, the processing may stop with the latest guess, or a previous guess that minimized the error, returned as the answer, at 785. Otherwise, the parameter guess vector is updated at 790 with the parameters for the other receiver updated, since the exact location of the second sensor is known with respect to the first sensor. V' is simulated again, at 740, based on these updated guesses and the above process of comparing the process signal with the measured signal and subsequent comparisons can be repeated. The update of the guess vector may be based on the calculation of a gradient that minimizes the error.

Figure 8:
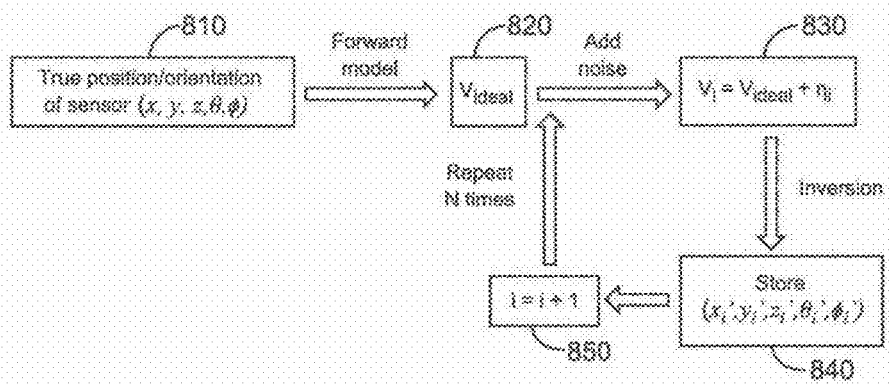
FIG. 8 shows features of a simulation to verify an inversion scheme and to analyze the accuracy obtained in determining the position of one or more sensors for different system configurations, in accordance with various embodiments.

FIG. 8 shows features of a simulation to verify an inversion scheme and to analyze the accuracy obtained in determining the position of one or more sensors for different system configurations. These simulations were conducted as Monte-Carlo simulations. At 810, the process begins with the true position/orientation vector (x, y, z, θ, φ). In the Monte Carlo simulations, an ideal signal is found, at 820, using the forward model corresponding to the position/orientation vector (x, y, z, θ, φ). To simulate the environmental and system noises and other measurement uncertainties, a random noise, $\eta_i$, can added to the ideal signal, $V_{ideal}$, to create the "measured" signal 610 of FIG. 6 and 710 of FIG. 7. The noises added to each row of $V_i$, that is each channel, are selected to be independent of each other. Here, the subscript i represents the iteration number of the Monte Carlo simulation. A uniform distribution between (−0.5 and 0.5) is used to create the random noise. The amplitude of this random noise is then scaled, and added in a multiplicative manner to the original signal as follows:

$$V_{i,j} = V_{ideal,j} \times (1 + u(-0.5, 0.5)/\text{SNR}) \quad (1)$$

In equation (1), j represents the index of a row of vectors $V_i$ and $V_{ideal}$, u(−0.5,0.5) represents a uniform random noise taking its values between −0.5 and 0.5, and SNR is the scaling factor that represents a signal-to-noise ratio. In the simulations, SNR was selected to be 50. $V_i$ is then inverted to produce the guess ($x_i$, $y_i$, $z_i$, $\theta_i$, $\phi_i$) for iteration I, stored at 840. The above process is repeated N times, using a counter at 850, to be able to accurately analyze the inversion performance for varying noise. Number of iterations (N) was selected as 100 in the simulations.

Figure 9:
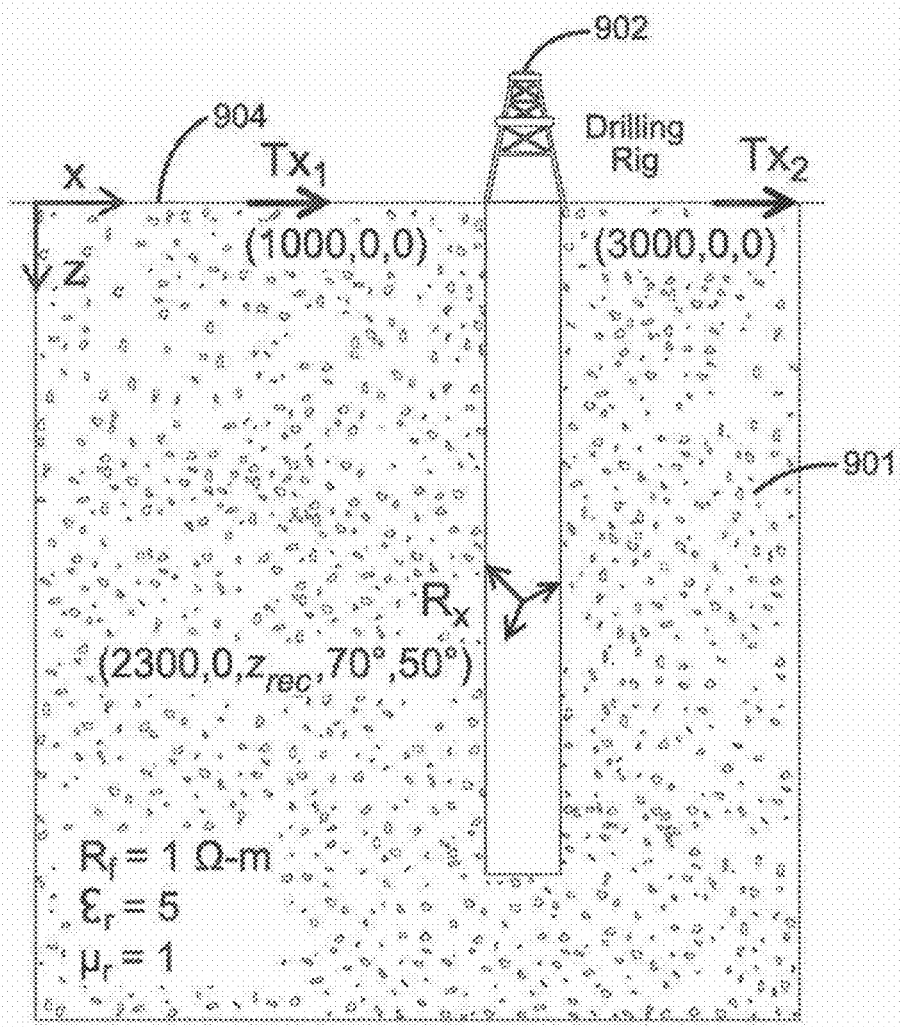
FIG. 9 shows a simulation geometry for a positioning system with two x-directed transmitters at the surface, in accordance with various embodiments.

FIG. 9 shows a simulation geometry for a positioning system with two x-directed transmitters at the surface. A reference coordinate system in terms of (x, z) with z being in the direction from surface 904 is indicated in FIG. 9 with origin (0, 0) at x-axis and z-axis shown. The positioning system of this example consists of two identical transmitters, $Tx_1$ and $Tx_2$, which are x-directed magnetic dipoles. These transmitters are located at positions of (x, y, z)=(1000, 0, 0) meters and (3000, 0, 0) meters with respect to the origin where x, y and z are positions in the x-direction, y-direction, and z-direction with respect to the reference coordinate system. The receiver, Rx, is a triad of magnetic dipoles. Its position is selected to be (2300, 0, $z_{rec}$), where $z_{rec}$ is the true vertical depth (TVD) and changed from 100 m to 10,000 m in 100 m steps to emulate the descent of receiver into the ground. Rx is assumed to have an elevation angle of 70° and an azimuth angle of 50°. Formation is assumed to have a resistivity of $R_f=1$ Ω-m, relative dielectric permittivity of $\varepsilon_r=5$ and a relative magnetic permeability of $\mu_r=1$. Although Rx, $Tx_1$, and $Tx_2$ lie on the same plane for this particular example, inversion does not incorporate this information. In other words, it is assumed that Rx may lie anywhere in the 3-dimensional space. In addition, drilling rig 902, $Tx_1$, and $Tx_2$ lie on the surface 904 for illustrative purposes, and formation 901 is assumed to be homogeneous.

Voltage received at the Rx sensor for this system is a vector with six components. With a goal to solve the position and orientation of Rx, there are five unknowns in the problem. Thus, the solution is overdetermined. With similar reasoning, it can be seen that even with a single transmitter and a single triad receiver, positioning is possible if orientation of the sensor is known via other means. For example, the orientation of Rx may be determined with the use of inclinometers.

FIGS. 10A-E show results of a Monte Carlo simulation for the simulation geometry of FIG. 9. These results are with 100 repetitions at each depth point, $z_{rec}$, of Rx. Curves 1042, 1052, 1062, 1072, and 1082 indicate the mean error between the sensor position and the simulations. Curves 1044, 1054, 1064, 1074, and 1084 show plus one standard deviation of the error from the mean. Curves 1046, 1056, 1066, 1076, and 1086 show minus one standard deviation of the error from the mean. In the Monte Carlo simulations, if the mismatch between the measured voltage and the voltage obtained using the inverted parameters is above a threshold, that particular inversion is discarded. This is akin to the real-time situation where an inversion would be deemed useless if the voltage calculated from the inverted parameters has a large difference with respect to the measured voltage. It can be seen from these results that the orientation of the sensor may be accurately determined even at large depths. Position determination is less accurate but the mean error generally stays within 5 meters for each position component.

FIGS. 11A-E show results of a Monte Carlo simulation for the positioning system of FIG. 9 where a second receiver is used, whose position is constrained with respect to the first receiver. In the simulation, the second receiver has a location constrained with respect to the first receiver such that the second receiver is 10 m below the first one in the tool axis and the orientation of the two receivers are same. Curves 1142, 1152, 1162, 1172, and 1182 indicate the mean error between the sensor position and the simulations. Curves 1144, 1154, 1164, 1174, and 1184 show plus one standard deviation of the error from the mean. Curves 1146, 1156, 1166, 1176, and 1186 show minus one standard deviation of the error from the mean. A slight improvement in inversion performance can be observed with the additional knowledge obtained from this second receiver.

Figure 12:
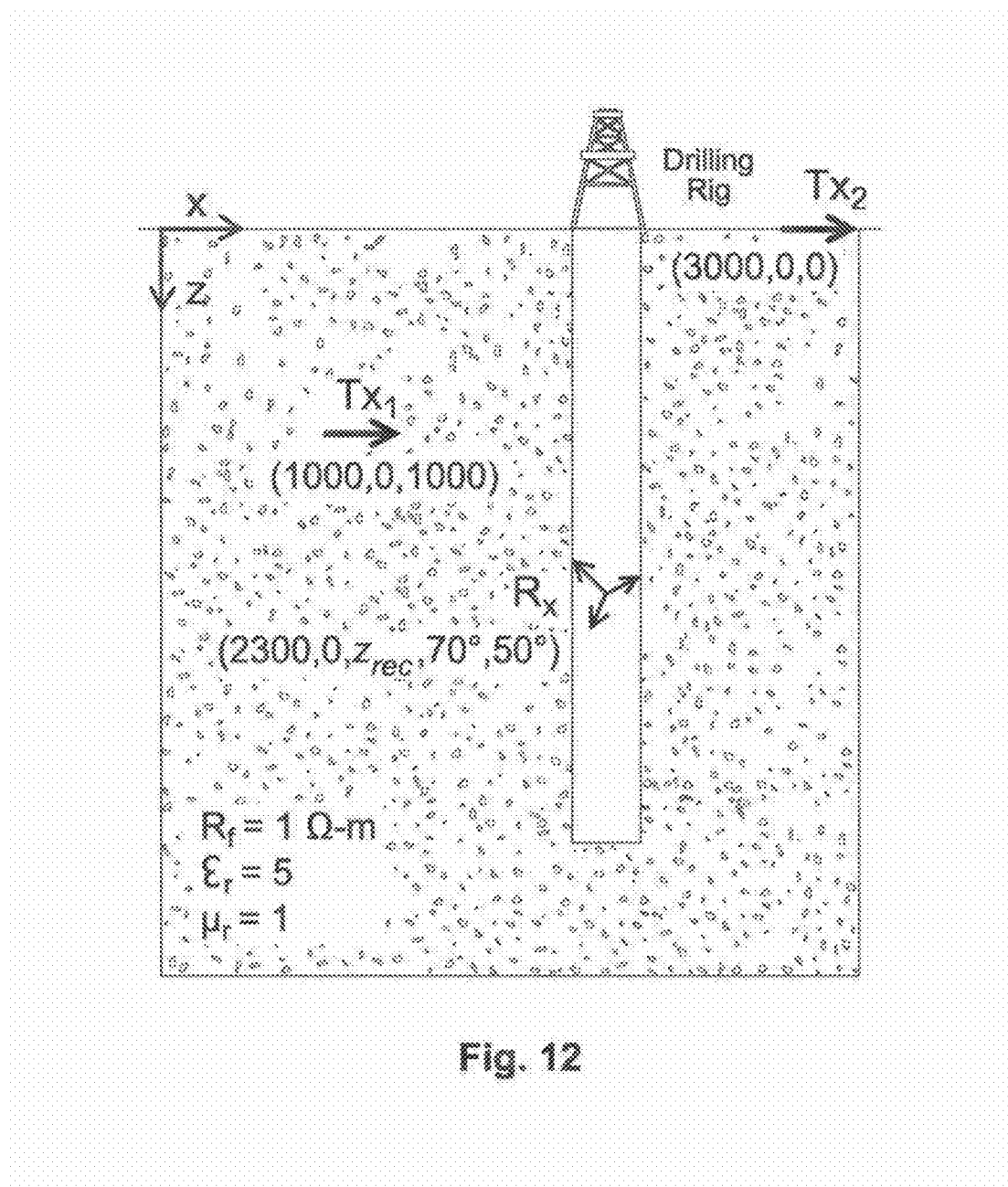
FIG. 12 shows a simulation geometry for a two transmitter positioning system, where one of the transmitters is underground, in accordance with various embodiments.

FIG. 12 shows a simulation geometry for a two transmitter positioning system where one of the transmitters is underground. This system is substantially the same as the geometry shown in FIG. 9, except one of the transmitters, $Tx_1$, is located underground at point (1000, 0, 1000) with respect to the origin with transmitter, $Tx_2$, on the surface at (3000, 0, 0). Receiver, Rx, at (2300, 0, $z_{rec}$) is assumed to have an elevation angle of 70° and an azimuth angle of 50°. Formation is assumed to have a resistivity of $R_f=1$ Ω-m, relative dielectric permittivity of $\varepsilon_r=5$ and a relative magnetic permeability of $\mu_r=1$.

FIGS. 13A-E show results of a Monte Carlo simulation for the positioning system of FIG. 12. Curves 1342, 1352, 1362, 1372, and 1382 indicate the mean error between the sensor position and the simulations. Curves 1344, 1354, 1364, 1374, and 1384 show plus one standard deviation of the error from the mean. Curves 1346, 1356, 1366, 1376, and 1386 show minus one standard deviation of the error from the mean. Results are similar to the case with both transmitters on the surface. In fact, a slight improvement in inversion performance can be observed, which can be attributed to the fact that the location of the transmitters in the positioning system of FIG. 12 better span the space. Thus, information obtained from these two transmitters is more independent.

Figure 14:
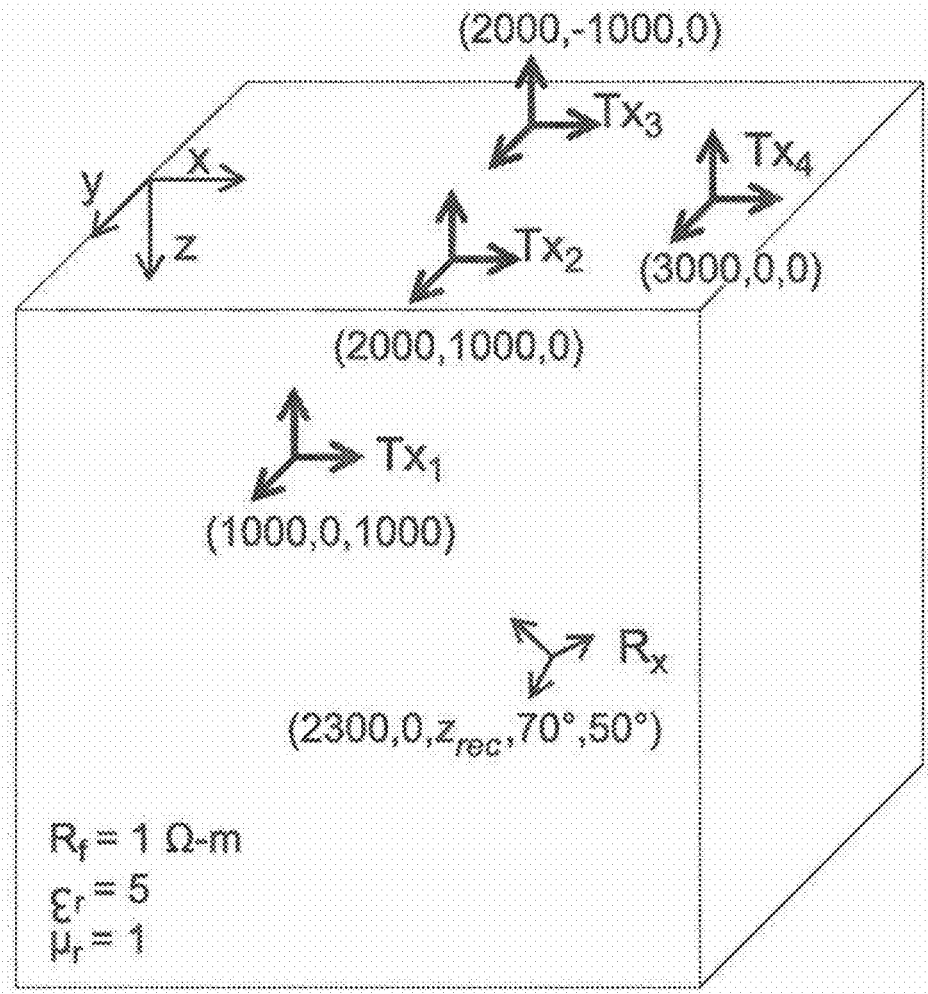
FIG. 14 shows a simulation geometry for a positioning system with four triad type transmitters, in accordance with various embodiments.

FIG. 14 shows a simulation geometry for a positioning system with four triad type transmitters. The example positioning system, which was simulated, consists of triad type transmitters, $Tx_1$, $Tx_2$, $Tx_3$, and $Tx_4$, at locations (1000, 0, 1000), (2000, 1000, 0), (2000, −1000, 0), and (3000, 0, 0), respectively. A deployed system can include transmitters at different locations and can include an increased number of transmitters. For the simulation, receiver, Rx, is a triad type receiver at a position of (2300, 0, $z_{rec}$), where zrec represents the true vertical depth, and Rx has 70° elevation angle and 50° azimuth angle. Formation is assumed to have a resistivity of $R_f=1$ Ω-m, relative dielectric permittivity of $\varepsilon_r=5$ and a relative magnetic permeability of $\mu_r=1$. Simulation results indicate that further improvements may be obtained by using triad type transmitters and increasing the number of transmitters.

FIG. 15A-E shows results of a Monte Carlo simulation for the positioning system of FIG. 14. Curves 1542, 1552, 1562, 1572, and 1582 indicate the mean error between the sensor position and the simulations. Curves 1544, 1554, 1564, 1574, and 1584 show plus one standard deviation of the error from the mean. Curves 1546, 1556, 1566, 1576, and 1586 show minus one standard deviation of the error from the mean. Standard deviation of error is cut almost in half compared to the system depicted in FIG. 12.

Methods other than using full inversion can be implemented to find the position of a receiver sensor or sensors in an underground formation. These other methods provide semi-analytical formulations to find the position. For example, once the angular position of the sources is found from the measurements, then by geometrical identities the position of the receiver can be found. Using the angular information alone may be advantageous in some situations if the magnitude of the signal from the sources could be affected by parameters other than the distance. For example, dispersion or refraction effects of the medium between the source and the receiver can affect the magnitude of the signal from the sources. Once the direction of the sources has been found, such as by using inversion methods, the angles ($\theta_{source}$, $\phi_{source}$) for each source are known. Once the orientations of the different sources at the surface or inside the formation are found, the position of the underground receiver relative to the sources can be deduced by geometric identities. Additional information can be obtained from the direction of the fields of each transmitter antenna. The information about the direction of the fields can help reduce the error in the determination of receiver position.

Figure 16:
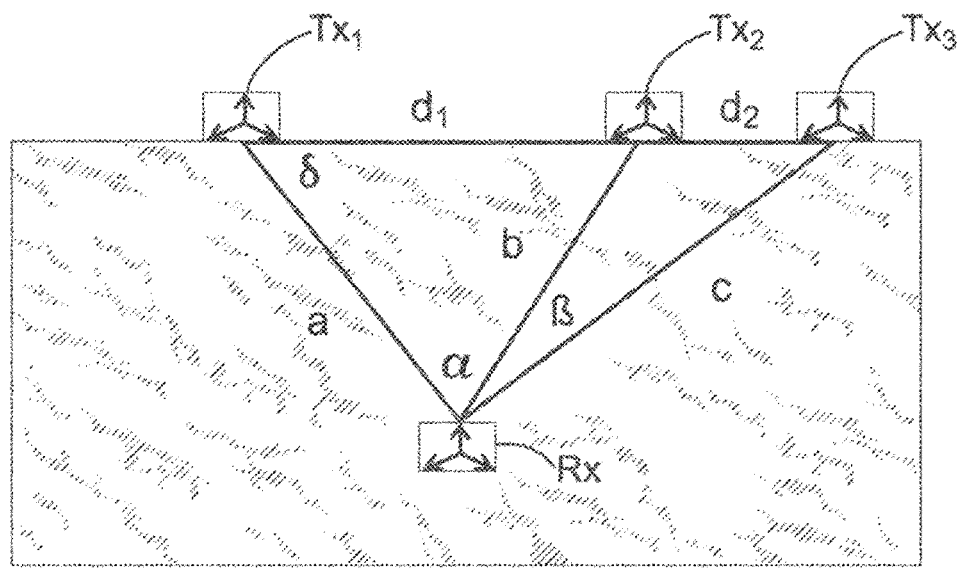
FIG. 16 shows a two-dimensional example with transmitters on the surface and a receiver underground to illustrate a method to find the position of the receiver relative to the sources from the known orientations of the sources, in accordance with various embodiments.

FIG. 16 shows 2-dimensional example with transmitters, $Tx_1$, $Tx_2$, $Tx_3$, on the surface and the receiver, Rx, underground to illustrate a method to find the position of the receiver relative to the sources from the known orientations of the sources. The position of Rx underground can be found using semi-analytical formulations by measuring the angular orientation of the sources at the surface and solving the trigonometric problem associated with the transmitters and receiver, where the position of the sources at the surface is known precisely. Additional information can be obtained from the direction of the fields of each transmitter antenna. The information about the direction of the fields can help reduce the error in the determination of receiver position. However, in this example, knowledge only of the direction of the antennas is assumed and not of the electric fields.

In this 2D example, shown in FIG. 16, all receiver and transmitters are located on the same plane. In this case, Rx does not have any reference to measure the angle of the sources. The measurements are the angles α and β between the directions of the sources. From the trigonometric identities of the cosine theorem, the following three equations can be derived:

$$d_1^2 = a^2 + b^2 - 2ab \cos(\alpha) \quad (2)$$

$$d_2^2 = b^2 + c^2 - 2bc \cos(\beta) \quad (3)$$

$$(d_1 + d_2)^2 = a^2 + c^2 - 2ac \cos(\alpha + \beta) \quad (4)$$

In equations (2), (3) and (4) the unknowns a, b and c can be obtained as functions of $d_1$ and $d_2$, which are the distances between the sources on the surface. Distance $d_1$ is the distance between $Tx_1$ and $Tx_2$, and distance $d_2$ is the distance between $Tx_2$ and $Tx_3$. These distances can be known with high precision. To solve for the position of Rx, it can be assumed that $Tx_1$ has position (0, 0). The cosine theorem can be applied again to obtain:

$$b^2 = a^2 + c^2 - 2ab \cos(\delta), \quad (5)$$

from which the angle δ can be obtained. The coordinates of the receiver position can be evaluated as x=a cos(δ) and y=a sin(δ).

Figure 17:
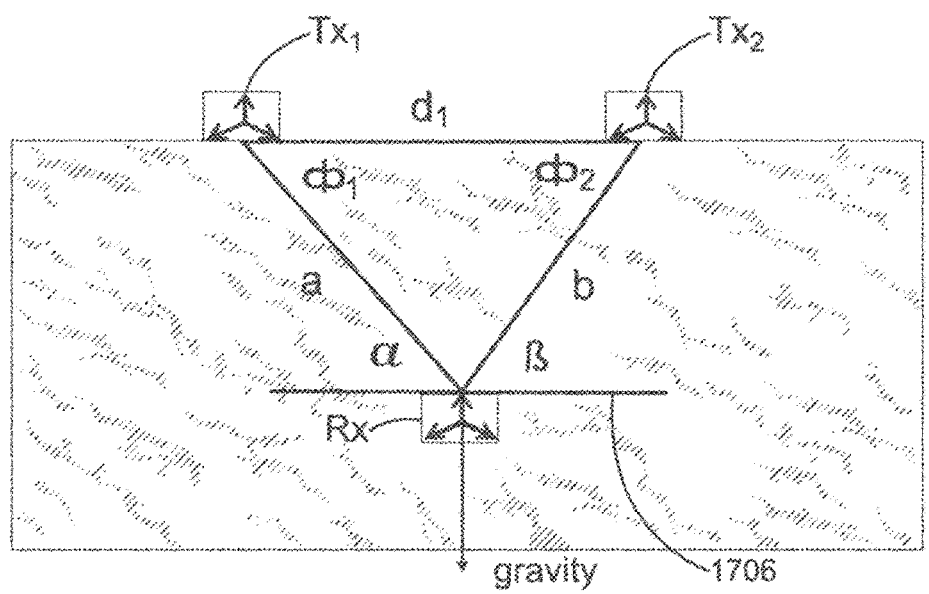
FIG. 17 shows a two-dimensional example with transmitters on the surface and a receiver underground in which the receiver has a reference direction, in accordance with various embodiments.

FIG. 17 shows a two-dimensional example with transmitters $Tx_1$ and $Tx_2$ on the surface and a receiver Rx underground in which the receiver has a reference direction. $Tx_1$ and $Tx_2$ are separated by a distance $d_1$. The reference known to Rx can be the direction of gravity, which points approximately towards the center of the earth. The direction of gravity is known and a plane 1706 perpendicular to the direction of gravity can be constructed. The directions of the sources can be referenced to the plane perpendicular to gravity. The angles α and β represent the directions of the sources. Assuming that the plane 1706 perpendicular to the direction of gravity and the surface of earth are parallel to each other, then, by a geometric theorem, $\Phi_1 = \beta$ and $\Phi_2 = \alpha$. With two internal angles $\Phi_1$ and $\Phi_2$ and the length $d_1$ known, all sides and angles of a triangle can be solved. Thus, in this example with a reference direction provided, only two sources are needed for this semi-analytical formulation.

The number of sources needed to find the position underground depends on how many directional references are available. If gravity gives a reference direction to the center of the earth and the local magnetic field orientation is known, providing a second reference direction, then the position of a receiver underground can be found with only two sources on the surface, assuming knowledge only of the angular position of the sources without information about the distance. Other methods include using a 3D situation with respect to transmitters and a receiver, without a given reference, in a manner similar to the abovementioned method in the 2D case, which makes use of the cosine theorem.

Figure 18:
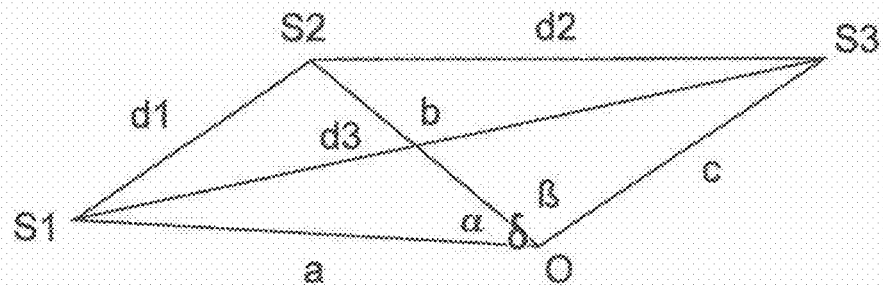
FIG. 18 shows a three-dimensional example with transmitters on the surface and a receiver underground in which the receiver has no reference direction, in accordance with various embodiments.

FIG. 18 shows a three-dimensional example with transmitters on the surface and a receiver underground in which the receiver has no reference direction, in accordance with various embodiments. S1, S2, and S3 are locations on the surface of three transmitters. The receiver is at location O. The distances $d_1$ between S1 and S2, $d_2$ between S2 and S3, and $d_3$ between S1 and S3 are known precisely. Angles α, β, and δ can be measured. From FIG. 18 the following equations hold:

$$d_1^2 = a^2 + b^2 - 2ab \cos(\alpha) \quad (6)$$

$$d_2^2 = b^2 + c^2 - 2bc \cos(\beta) \quad (7)$$

$$d_3^2 = a^2 + c^2 - 2ac \cos(\delta) \quad (8)$$

where the unknowns a, b and c can be found. From the known positions of the sources and the solved a, b and c, the position of the receiver at O can be found in these semi-analytical formulations. If the source is a triad and the direction of the source dipole is known, then there is more information available because the direction of oscillation of the source field provides extra information. In addition, to be able to distinguish different sources, each source could use a different frequency. The use of more sources is convenient because it can improve the accuracy of the positioning.

Simulations can be applied to semi-analytical approaches. Using the positioning system shown in FIG. 9A, a simulation example can be presented using 2D semi-analytical formulations. For this 2D example, it was assumed that the receiver is known to lie on the same plane with the two transmitters. Then, angles α and β, depicted in FIG. 17, can be found as the arc tangent of the ratio of vertical and horizontal distances from each transmitter to the receiver. These distances can be found by using the received data due to a single transmitter rather than using the previously discussed inversion schemes. Such an approach can be conducted by comparing measured signals with calculated signals similar to the inversion schemes discussed before. The results of a semi-analytical approach may be more useful in cases where gain fluctuations in receiver and transmitter are an issue or in dispersive/refractive media.

In some other applications, if transmitter and receiver are both triads with known orientations, they can be rotated in a way to obtain two dipoles where the received signal is zero. This is only possible if the receiver is at infinity, which can be discarded in practical applications; or if the transmitting and receiving dipoles lie parallel to the line connecting them, which provides the angular information. Other variations and combinations of the aforementioned methods may also be used to find the angular information.

Figure 19A:
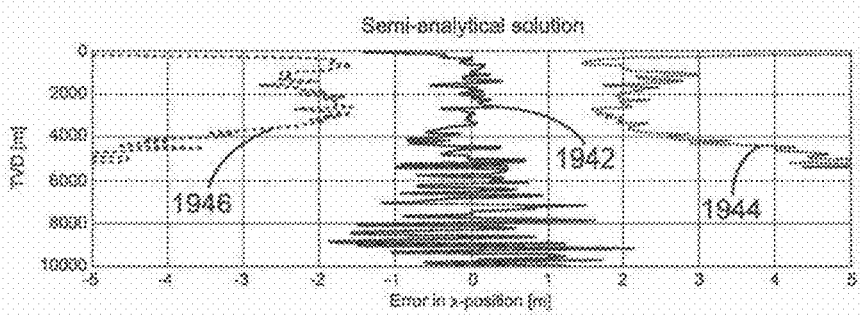
FIGS. 19A-B show Monte Carlo simulation results using a semi-analytical solution for the positioning system shown in FIG. 9, in accordance with various embodiments.
Figure 19B:
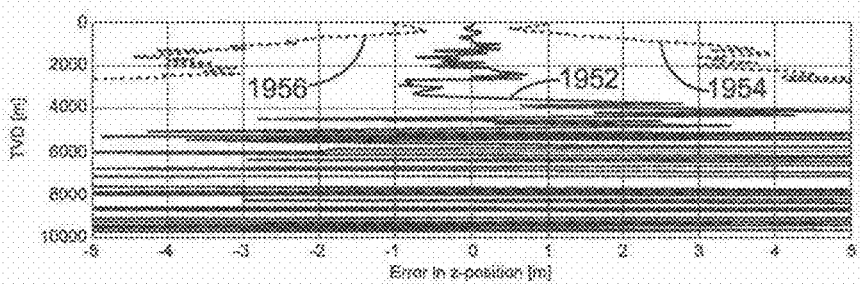

FIGS. 19A-B shows Monte Carlo simulation results using a semi-analytical solution for the positioning system shown in FIG. 9. The receiver position in the x-plane and the z-plane were found using angular information. True vertical depth is changed between 100 and 10,000 meters in 100 meter steps, and 100 repetitions of simulations were performed at each step for an SNR value of 50. Curves 1942 and 1952 indicate the mean error between the sensor position and the simulations. Curves 1944 and 1954 show plus one standard deviation of the error from the mean. Curves 1946 and 1956 show minus one standard deviation of the error from the mean. Results have slightly less accuracy than the ones shown in FIG. 10, since angular information is obtained using the interaction between just a single transmitter and a single receiver.

In various embodiments, methods to find a position in an underground formation can include electric-field based positioning. In the previous examples, both transmitters and receivers were assumed to be magnetic dipoles. Thus, receivers measured the magnetic fields. If electric fields at the receivers are measured instead, a different approach may be used to obtain the position of the receiver.

Figure 20:
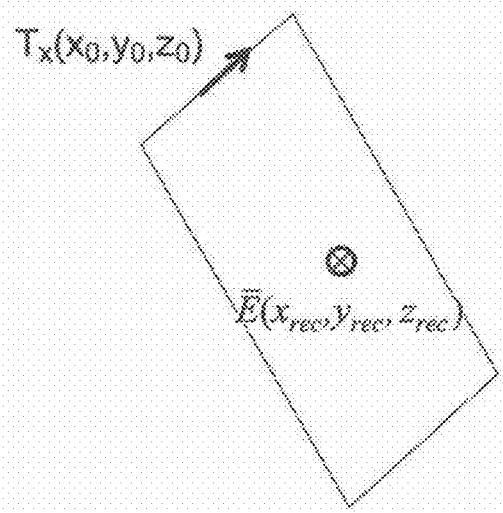
FIG. 20 shows an electric field at the receiver, due to a magnetic dipole, that is normal to the plane where receiver and transmitter are located, in accordance with various embodiments.

FIG. 20 shows an electric field at the receiver, due to a magnetic dipole, that is normal to the plane where receiver and transmitter are located. The electric field of a magnetic dipole only has a circumferential (φ) component. Thus, the electric field, $E(x_{rec}, y_{rec}, z_{rec})$ at the receiver is normal to the plane where the transmitter $T_x(x_0, y_0, z_{rec})$ and receiver lie. This plane may thus be defined by the following formula:

$$n_{x0}(x-x_0)+n_{y0}(y-y_0)+n_{z0}(z-z_0)=0 \quad (9)$$

In equation (9), $n_{x0}$, $n_{y0}$ and $n_{z0}$ represent the x, y, and z components of a unit vector that has the same direction with the electric field and $(x_0,y_0,z_0)$ is the transmitter position. If there are three such linearly independent equations for three different transmitters (in other words if planes obtained from equation (9) are not the same for two or more transmitters), the independent equations may be solved to obtain the receiver position as shown in equation (10). The vector $(n_{xi}, n_{yi}, n_{zi})$ is the unit vector parallel to the electric field at the receiver produced by transmitter i at location $(x_i, y_i, z_i)$, where i=0, 1, 2.

$$\begin{bmatrix} x \\ y \\ z \end{bmatrix} = \begin{bmatrix} n_{x0} & n_{y0} & n_{z0} \\ n_{x1} & n_{y1} & n_{z1} \\ n_{x2} & n_{y2} & n_{z2} \end{bmatrix}^{-1} \begin{bmatrix} n_{x0}x_0 + n_{y0}y_0 + n_{z0}z_0 \\ n_{x1}x_1 + n_{y1}y_1 + n_{z1}z_1 \\ n_{x2}x_2 + n_{y2}y_2 + n_{z2}z_2 \end{bmatrix} \quad (10)$$

For practical applications, it is straight forward to satisfy the independence requirement in a volume of interest. For example, if all three transmitters lie on a flat surface apart from each other, and the receiver is not on this surface, planes obtained by equation (9) will always intersect at the point where the receiver is located.

In practical applications, noise will affect the accuracy of the results. In those cases, it may be desired to add additional information to improve accuracy. Additional information can include using additional transmitting sources, each at a known position. For these cases, the matrix of unit vectors may not be a square matrix. Thus, a pseudo-inverse of the matrix should be used instead in equation (10). No iterative inversion is applied in this approach; thus, results are obtained much faster than the inversion approach. However, orientation of the receiver sensor must be known accurately via other means.

Figure 21:
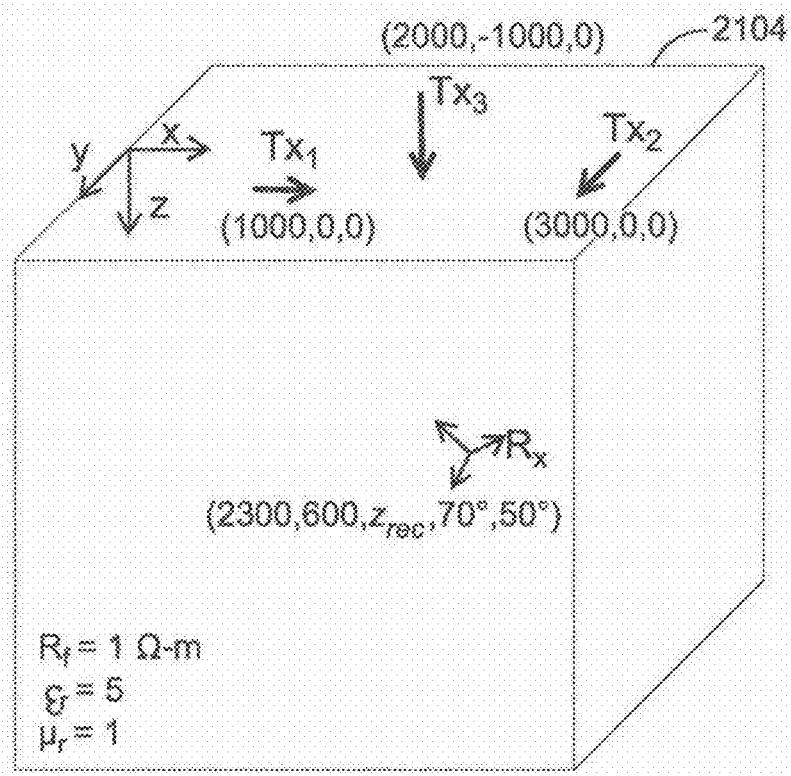
FIG. 21 shows a simulated system for electric field based positioning system, in accordance with various embodiments.

FIG. 21 shows a simulated system for electric field based positioning system. A reference coordinate system in terms of (x, y, z) with z being in the direction from surface 2104 is indicated in FIG. 21 with origin (0, 0, 0) at x-axis, y-axis, and z-axis shown. The positioning system of this example has three transmitters: $Tx_1$, a x-directed magnetic dipole at (1000, 0, 0); $Tx_2$, a y-directed magnetic dipole at (3000, 0, 0); and $Tx_3$, a z-directed magnetic dipole at (2000, -1000, 0). Receiver Rx, a triad of electric dipoles, is at (2300, 600, $z_{rec}$), where $z_{rec}$ represents the TVD. As before, Monte Carlo simulations are repeated 100 times at each depth step as TVD is changed from 100 m to 10,000 m in steps of 100 m and SNR is taken as 50. Rx is assumed to have an elevation angle of 70° and an azimuth angle of 50°. Formation is assumed to have a resistivity of $R_f$=1 Ω-m, relative dielectric permittivity of $\varepsilon_r$=5 and a relative magnetic permeability of $\mu_r$=1.

Figure 22A:
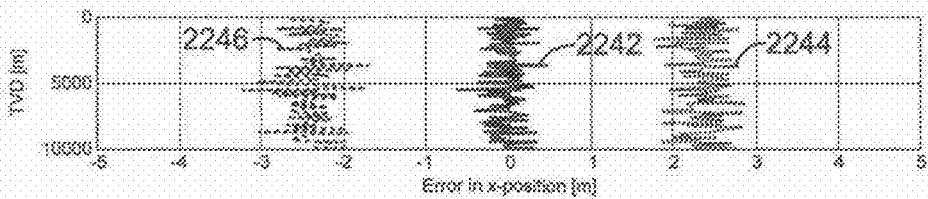
FIGS. 22A-C show Monte Carlo simulation results using an electric field based positioning system of FIG. 21, in accordance with various embodiments.
Figure 22B:
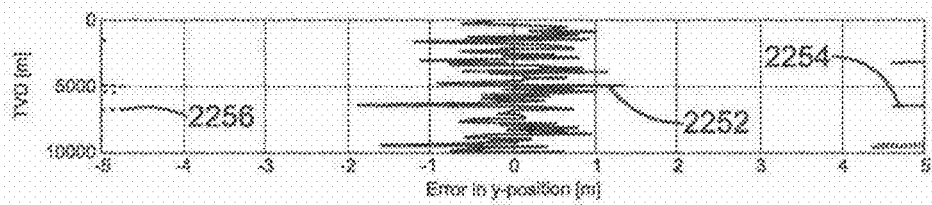
Figure 22C:
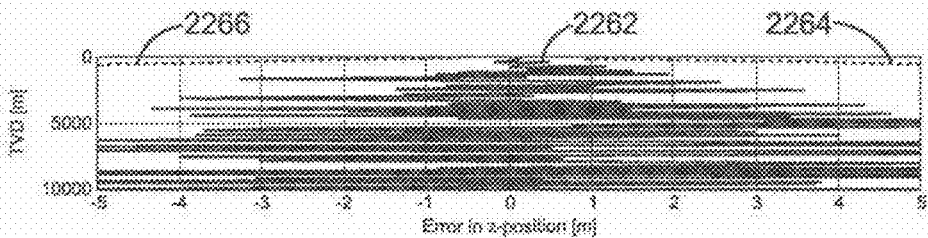

FIGS. 22A-C show Monte Carlo simulation results using the electric field based positioning system of FIG. 21. The Monte Carlo simulation results are for errors in x-position, y-position, and z-position of the receiver shown in FIG. 21. Curves 2242, 2252, and 2262 indicate the mean error between the sensor position and the simulations. Curves 2244, 2254, and 2264 show plus one standard deviation of the error from the mean. Curves 2246, 2256, and 2266 show minus one standard deviation of the error from the mean. Accuracy is not as good as the inversion approach, but still a reasonable approximation to the true receiver location is obtained.

Based on the duality theorem, electric dipoles can be used in the examples discussed herein. For example, if transmitters are electric dipoles, a magnetic field will be normal to the plane containing the receiver and transmitter locations instead of the electric field. Thus, the method described herein may be used by measuring the magnetic fields at the receiver.

In various embodiments, features of a method to locate a receiver downhole comprise: receiving signals from a receiver in an underground formation in response to signals generated from three or more transmitting sources, each of the three or more transmitting sources located at a known position, at least one transmitting source of the three or more transmitting sources separated from and mounted on a structure different from at least one other transmitting source of the three or more transmitting sources; and processing the received signals, using an inversion process based on the signals generated from the three or more transmitting sources, to determine the position of the receiver. The processing of the signals to determine the position of the receiver can be conducted downhole. Downhole processing can be conducted using electronics integrated with the receiver, where the information concerning the known locations of the transmitting sensors is stored with the electronics along with instructions to process the signals. The downhole processing can be located using electronics disposed on the structure on which the receiver is disposed and separated from the receiver. The downhole processing can allow for automated geosteering. Alternatively, the processing unit can be conducted at the surface in response to receiving the signals or data regarding the signals from the receiver.

Features of the method can include controlling the three or more transmitting sources including a transmitting source that has a current-carrying wire of a closed loop of a circuit, the current-carrying wire being at a known position and the current-carrying wire is arranged the current-carrying wire arranged along a straight-line path such that signals received at the receiver from the closed loop are negligible from portions of the closed loop that follow a path different from the straight-line path. Features of the method can include controlling the three or more transmitting sources including a transmitting source that has a number of current-carrying wires forming a closed loop of a circuit, each of the number of current-carrying wires being at a known position and arranged along a straight-line path such that signals received at the receiver from the closed loop are negligible from portions of the closed loop that follow a path different from the straight-line paths; and processing the signals based on a model of the number of current-carrying wires and their corresponding straight-line paths. Controlling the three or more transmitting sources can include controlling at least three dipole transmitters. Controlling the three or more transmitting sources can include controlling a source generating large distribution of current aboveground or near ground that generate electromagnetic fields below ground, the electromagnetic fields measurable at the receiver, the large distribution of current being at a known position. The three or more transmitting sources include one or more transmitting sources located aboveground. The three or more transmitting sources can include a transmitter in a well. The well can be different from a well in which the receiver is located or the well can be the well in which the receiver is located. The three or more transmitting sources can include no more than two transmitters in a plane that contains the receiver. Controlling the three or more transmitting sources can include conducting various combinations of these embodiments of features to control the three or more transmitting sources.

Features of the method can include generating at least one signal of the generated signals from a transmitting source aboveground or near ground, the signal having a low frequency to penetrate deeply underground such that the signal is measurable in an underground volume extending from a hundred feet to thousands feet in depth and from a hundred feet to thousands of feet across the depth. The method can include operating the three or more transmitting sources sequentially such that only one of the three or more transmitting sources is on at one time period. The method can include operating each of the transmitting sources at a frequency less than about 50 Hz.

Using an inversion process can include: generating values of a signal expected at the receiver from each of the transmitting sources; generating a difference between the signal expected and the signal received from the receiver; when the difference is less than a threshold, selecting values of coordinates for the receiver, as the position of the receiver, that generated the signal expected at the receiver for which the difference is less than the threshold; and when the difference is greater than the threshold, generating new values of a signal expected at the receiver and determine if a difference between the new values and the signal received from the receiver is less than the threshold. Generating values of the signal expected at the receiver can include using an estimate of the position of the receiver with a forward model. Generating values of the signal expected at the receiver can include using an estimate of the position of the receiver with a lookup table.

Using an inversion process can include: generating an estimate of the position of the receiver, the receiver taken as a first receiver; generating an estimate of each position of one or more other receivers, each of the one or more other receivers having a known position with respect to the first receiver; generating values of signals expected at the first receiver and at the one or more other receivers from each of the transmitting sources; generating a difference between the values of the signals expected and a combination of the signal received at the first receiver and signals received at the one or more other receivers; when the difference is less than a threshold, selecting values of coordinates of the first receiver, as the position of the first receiver, that generated the signals expected at the first receiver for which the difference is less than the threshold; and when the difference is greater than the threshold, generating a new estimate of the position of the first receiver, if the inversion process is within a maximum iteration.

Using an inversion process can include: generating sets of values of a signal expected at the receiver, each set generated from a different estimate of the position of the receiver; generating differences between the values of the signal expected and the signal received from the receiver for each set; and selecting the estimate that minimizes error in the difference between the values of the signal expected and the signal received from the receiver. Generating the sets of values of signals expected at the receiver can include using a forward model with each of the estimates.

In various embodiments, features of a second method to locate a receiver downhole comprise: receiving signals from a receiver in an underground formation in response to signals generated from three or more transmitting sources, each of the three or more transmitting sources located at a known position, at least one transmitting source of the three or more transmitting sources separated from and mounted on a structure different from at least one other transmitting source of the three or more transmitting sources; determining angles with respect to the transmitters relative to the receiver based on the received signals; and determining a position of the receiver based on the angles and the known positions. The determining of angles and the determining of the position of the receiver can be conducted downhole. Determining angles and determining of the position of the receiver can be conducted using electronics integrated with the receiver, where the information concerning the known locations of the transmitting sensors is stored with the electronics along with instructions to process the signals. The downhole processing can be located using electronics disposed on the structure on which the receiver is disposed and separated from the receiver. The downhole processing can allow for automated geosteering. Alternatively, the processing unit can be conducted at the surface in response to receiving the signals or data regarding the signals from the receiver.

The second method can include controlling the three or more transmitting sources including a transmitting source that has a current-carrying wire of a closed loop of a circuit, the current-carrying wire being at a known position and arranged along a straight-line path such that signals received at the receiver from the closed loop are negligible from portions of the closed loop that follow a path different from the straight-line path. Features of the second method can include controlling the three or more transmitting sources including a transmitting source that has a number of current-carrying wires forming a closed loop of a circuit, each of the number of current-carrying wires being at a known position and arranged along a straight-line path such that signals received at the receiver from the closed loop are negligible from portions of the closed loop that follow a path different from the straight-line paths; and processing the signals based on a model of the number of current-carrying wires and their corresponding straight-line paths. Controlling the three or more transmitting sources can include at least three dipole transmitters. The three or more transmitting sources can include one or more transmitting sources located aboveground. The second method can include generating at least one signal of the generated signals from a transmitting source aboveground or near ground, the signal having a low frequency to penetrate deeply underground such that the signal is measurable in an underground volume extending from a hundred feet to thousands feet in depth and from a hundred feet to thousands of feet across the depth.

The second method can include using gravity to provide a reference. Determining the position of the receiver can include evaluating geometric identities using the angles and the known positions. Evaluating geometric identities can include using a cosine theorem. The second method can include operating each of the transmitters at a frequency different from that of the other ones of the number of transmitters. The transmitters can also be operated sequentially.

In various embodiments, features of a third method to locate a receiver downhole comprise: determining an electric field at a receiver, located in an underground formation, in response to signals generated from three or more magnetic dipoles located at known positions such that there are at least three distinct planes defined respectively by location of one of the three or more magnetic dipoles and the electric field at the receiver due to the respective magnetic dipole; and determining the position of the receiver based on the known positions and a direction of the electric field. Determining of the position of the receiver can be conducted downhole. Determining of the position of the receiver can be conducted using electronics integrated with the receiver, where the information concerning the known locations of the transmitting sensors is stored with the electronics along with instructions to process the signals. The downhole processing can be located using electronics disposed on the structure on which the receiver is disposed and separated from the receiver. The downhole processing can allow for automated geosteering. Alternatively, the processing unit can be conducted at the surface in response to receiving the signals or data regarding the signals from the receiver.

In embodiments of the third method, the three or more magnetic dipoles can be located aboveground or near ground. In an embodiment, no more than two transmitters and the receiver are in a plane.

In various embodiments, components of a system operable to find a position in an underground formation, as described herein or in a similar manner, can be realized in combinations of hardware and software based implementations. These implementations can include a machine-readable storage device having machine-executable instructions, such as a computer-readable storage device having computer-executable instructions, to find a position in an underground formation. Executed instructions can also include instructions to operate one or more transmitters to generate signals. Executed instructions can also include instructions to operate one or more receivers to provide signals in response to the signals generated by the one or more transmitters in accordance with the teachings herein. The instructions can include instructions to provide data to a processing unit such that the processing unit conducts one or more processes to evaluate signals, data, or signals and data. Further, a machine-readable storage device, herein, is a physical device that stores data represented by physical structure within the device. Examples of machine-readable storage devices include, but are not limited to, read only memory (ROM), random access memory (RAM), a magnetic disk storage device, an optical storage device, a flash memory, and other electronic, magnetic, and/or optical memory devices.

In various embodiments, features of an embodiment of a machine-readable storage device can include having instructions stored thereon, which, when performed by a machine, cause the machine to perform operations to: receive signals from a receiver in an underground formation in response to signals generated from three or more transmitting sources, each of the three or more transmitting sources located at a known position, at least one transmitting source of the three or more transmitting sources separated from and mounted on a structure different from at least one other transmitting source of the three or more transmitting sources; and process the received signals, using an inversion process based on the signals generated from the three or more transmitting sources, to determine the position of the receiver. The instructions can include instructions to control the three or more transmitting sources including a transmitting source that has a current-carrying wire of a closed loop of a circuit, the current-carrying wire being at a known position and arranged along a straight-line path such that signals received at the receiver from the closed loop are negligible from portions of the closed loop that follow a path different from the straight-line path. The instructions can include instructions to: control the three or more transmitting sources including a transmitting source that has a number of current-carrying wires forming a closed loop of a circuit, each of the number of current-carrying wires arranged along a straight-line path such that signals received at the receiver from the closed loop are negligible from portions of the closed loop that follow a path different from the straight-line paths; and process the signals based on a model of the number of current-carrying wires and their corresponding straight-line paths. The instructions can include instructions to control the three or more transmitting sources including at least three dipole transmitters. The instructions can include instructions to control the three or more transmitting sources including a source generating large distribution of current aboveground or near ground that generate electromagnetic fields below ground, the electromagnetic fields measurable at the receiver, the large distribution of current being at a known position. The three or more transmitting sources can include no more than two transmitters in a plane that contains the receiver. The three or more transmitting sources can include a transmitter in a well. The well can be different from a well in which the receiver is located or the well can be the well in which the receiver is located. Instructions controlling the three or more transmitting sources can include conducting various combinations of these features to control the three or more transmitting sources.

The instructions can include instructions to generate at least one signal of the generated signals from a transmitting source aboveground or near ground, the signal having a low frequency to penetrate deeply underground such that the signal is measurable in an underground volume extending from a hundred feet to thousands feet in depth and from a hundred feet to thousands of feet across the depth. The instructions can include instructions to operate the three or more transmitting sources sequentially such that only one of the three or more transmitting sources is on at one time period. The instructions can include instructions to operate one or more of the transmitting sources located aboveground. The machine-readable storage device can include instructions to operate each of the transmitters at a frequency less than about 50 Hz.

In the instructions stored in the machine-readable storage device, using the inversion process can include: generating values of a signal expected at the receiver from each of the transmitting sources; generating a difference between the signal expected and the signal received from the receiver; when the difference is less than a threshold, selecting values of coordinates for the receiver, as the position of the receiver, that generated the signal expected at the receiver for which the difference is less than the threshold; and when the difference is greater than the threshold, generating new values of a signal expected at the receiver and determine if a difference between the new values and the signal received from the receiver is less than the threshold. Generating values of the signal expected at the receiver can include using an estimate of the position of the receiver with a forward model. Generating values of the signal expected at the receiver can include using an estimate of the position of the receiver with a lookup table.

In the instructions stored in the machine-readable storage device, using the inversion process can include: generating an estimate of the position of the receiver, the receiver taken as a first receiver; generating an estimate of each position of one or more other receivers, the one or more other receivers having a known position with respect to the first receiver; generating values of signals expected at the first receiver and at the one or more other receivers from each of the transmitting sources; generating a difference between the values of the signals expected and a combination of the signal received at the first receiver and signals received at the one or more other receivers; when the difference is less than a threshold, selecting values of coordinates of the first receiver, as the position of the first receiver, that generated the signal expected at the first receiver for which the difference is less than the threshold; and when the difference is greater than the threshold, generating a new estimate of the position of the first receiver, if the inversion process is within a maximum iteration.

In the instructions stored in the machine-readable storage device, using the inversion process can include: generating sets of values of a signal expected at the receiver, each set generated from a different estimate of the position of the receiver; generating differences between the values of the signal expected and the signal received from the receiver for each set; selecting the estimate that minimizes error in the difference between the values of the signal expected and the signal received from the receiver. Generating the sets of values of the signal expected at the receiver can include using a forward model with each of the estimates.

In various embodiments, features of a second embodiment of a machine-readable storage device can include having instructions stored thereon, which, when performed by a machine, cause the machine to perform operations to: receive signals from a receiver in an underground formation in response to signals generated from three or more transmitting sources, each of the three or more transmitting sources located at a known position, at least one transmitting source of the three or more transmitting sources separated from and mounted on a structure different from at least one other transmitting source of the three or more transmitting sources; determine angles with respect to the transmitters relative to the receiver based on the received signals; and determine the position of the receiver based on the angles and the known positions. The instructions can include instructions to control the three or more transmitting sources including a transmitting source that has a current-carrying wire of a closed loop of a circuit, the current-carrying wire being at a known position and arranged along a straight-line path such that signals received at the receiver from the closed loop are negligible from portions of the closed loop that follow a path different from the straight-line path. The instructions can include instructions to: control the three or more transmitting sources including a transmitting source that has a number of current-carrying wires forming a closed loop of a circuit, each of the number of current-carrying wires being at a known position and arranged along a straight-line path such that signals received at the receiver from the closed loop are negligible from portions of the closed loop that follow a path different from the straight-line paths; and process the signals based on a model of the number of current-carrying wires and their corresponding straight-line paths.

The instructions can include instructions to control the three or more transmitting sources including at least three dipole transmitters. The instructions can include instructions to control the three or more transmitting sources including transmitting sources located aboveground. The instructions can include instructions to generate at least one signal of the generated signals from a transmitting source aboveground or near ground, the signal having a low frequency to penetrate deeply underground such that the signal is measurable in an underground volume extending from a hundred feet to thousands feet in depth and from a hundred feet to thousands of feet across the depth.

In the second embodiment of a machine-readable storage device can include instructions to perform operations, wherein operations to determine the position can include evaluating geometric identities using the angles and the known positions. Evaluating geometric identities can include using a cosine theorem. The operations can include using gravity to provide a reference direction. The operations can include operating each of the transmitters at a frequency different from that of the other ones of the number of transmitters. The operations can include operating the transmitters sequentially with a single frequency.

In various embodiments, features of an embodiment of a machine-readable storage device can include having instructions stored thereon, which, when performed by a machine, cause the machine to perform operations to: determine an electric field at a receiver, located in an underground formation, in response to signals generated from three or more magnetic dipoles located at known positions such that there are at least three distinct planes defined respectively by location of one of the three or more magnetic dipoles and the electric field at the receiver due to the respective magnetic dipole; and determine the position of the receiver based on the known positions and a direction of the electric field. The three or more magnetic dipoles can be located aboveground or near ground. The three or more magnetic dipoles can be arranged with no more than two transmitters and the receiver in a plane.

In various embodiments, an embodiment of an example system can comprise: three or more transmitting sources, each of the sources located at a known position, at least one transmitting source of the three or more transmitting sources separated from and mounted on a structure different from at least one other transmitting source of the three or more transmitting sources; a control unit arranged to control generation of signals from the three or more transmitting sources; a receiver in an underground formation, the receiver operable to receive signals in response to the generation from the three or more transmitting sources; and a processing unit arranged to process the received signals, using an inversion process based on the signals generated from the three or more transmitting sources, to determine the position of the receiver. The processing unit can be located downhole. The processing unit can be realized by electronics integrated with the receiver, where the information concerning the known locations of the transmitting sensors is stored with the electronics along with instructions to process the signals. The processing unit can be realized by electronics disposed on the structure on which the receiver is disposed and separated from the receiver. The processing unit can be located downhole, which can allow for automated geosteering. Alternatively, the processing unit can be located at the surface, responsive to receiving the signals or data regarding the signals from the receiver.

The three or more transmitting sources can include a transmitting source that has a current-carrying wire of a closed loop of a circuit, the current-carrying wire being at a known position and arranged along a straight-line path such that signals received at the receiver from the closed loop are negligible from portions of the closed loop that follow a path different from the straight-line path. The three or more transmitting sources can include a transmitting source that has a number of current-carrying wires forming a closed loop of a circuit, each of the number of current-carrying wires being at a known position and arranged along a straight-line path such that signals received at the receiver from the closed loop are negligible from portions of the closed loop that follow a path different from the straight-line paths; and the processing unit is arranged to process the signals based on a model of the number of current-carrying wires and their corresponding straight-line paths. The three or more transmitting sources can include a source operable to generate large distribution of current aboveground or near ground that generates electromagnetic fields below ground, the electromagnetic fields measurable at the receiver, the large distribution of current being at a known position. The three or more transmitting sources can include one or more transmitting sources located aboveground. The three or more transmitting sources can include a transmitter in a well. The well can be different from a well in which the receiver is located or the well can be the well in which the receiver is located. The three or more transmitting sources can include no more than two transmitters in a plane that contains the receiver. The three or more transmitting sources can be arranged with various combinations of these example embodiments of three or more transmitting sources.

The control unit can be structured to be operable to generate at least one signal of the generated signals from a transmitting source aboveground or near ground, the signal having a low frequency to penetrate deeply underground such that the signal is measurable in an underground volume extending from a hundred feet to thousands feet in depth and from a hundred feet to thousands of feet across the depth. The control unit can be structured to operate the three or more transmitting sources sequentially such that only one of the three or more transmitting sources is on at one time period. The control unit can be arranged to operate each of the transmitting sources at a frequency less than about 50 Hz.

The processing unit can be arranged to use an inversion process that includes the processing unit operable to: generate values of a signal expected at the receiver from each of the transmitting sources; generate a difference between the signal expected and the signal received from the receiver; when the difference is less than a threshold, select values of coordinates for the receiver, as the position of the receiver, that generated the signal expected at the receiver for which the difference is less than the threshold; and when the difference is greater than the threshold, generate new values of a signal expected at the receiver and determine if a difference between the new values and the signal received from the receiver is less than the threshold. The processing unit can be structured to be operable to use an estimate of the position of the receiver with a forward model. The processing unit can be structured to be operable to use an estimate of the position of the receiver with a lookup table.

The processing unit can be arranged to use an inversion process that includes the processing unit operable to: generate an estimate of the position of the receiver, the receiver taken as a first receiver; generate an estimate of each position of one or more other receivers, each of the one or more other receivers having a known position with respect to the first receiver; generate values of signals expected at the first receiver and at the one or more other receivers from each of the transmitting sources; generate a difference between the values of the signals expected and a combination of the signal received at the first receiver and signals received at the one or more other receivers; when the difference is less than a threshold, select values of coordinates of the first receiver, as the position of the first receiver, that generated the signal expected at the first receiver for which the difference is less than the threshold; and when the difference is greater than the threshold, generate a new estimate of the position of the first receiver, if the inversion process is within a maximum iteration.

The processing unit can be arranged to use an inversion process that includes the processing unit operable to: generate sets of values of a signal expected at the receiver, each set generated from a different estimate of the position of the receiver; generate differences between the values of the signal expected and the signal received from the receiver for each set; and select the estimate that minimizes error in the difference between the values of the signal expected and the signal received from the receiver. The processing unit can be structured to be operable to use a forward model with each of the estimates.

In various embodiments, a second example of a system can comprise: three or more transmitting sources, each of the transmitting sources located at a known position, at least one transmitting source of the three or more transmitting sources separated from and mounted on a structure different from at least one other transmitting source of the three or more transmitting sources; a control unit arranged to control generation of signals from the three or more transmitting sources; a receiver in an underground formation, the receiver operable to receive signals in response to the generation from the three or more transmitting sources; a processing unit arranged to determine angles with respect to the transmitters relative to the receiver based on the received signals and to determine the position of the receiver based on the angles and the known positions. The processing unit can be located downhole. The processing unit can be realized by electronics integrated with the receiver, where the information concerning the known locations of the transmitting sensors is stored with the electronics along with instructions to process the signals. The processing unit can be realized by electronics disposed on the structure on which the receiver is disposed and separated from the receiver. The processing unit can be located downhole, which can allow for automated geosteering. Alternatively, the processing unit can be located at the surface, responsive to receiving the signals or data regarding the signals from the receiver.

In the second embodiment of an example system, the three or more transmitting sources can include a transmitting source that has a current-carrying wire of a closed loop of a circuit, the current-carrying wire being at a known position and arranged along a straight-line path such that signals received at the receiver from the closed loop are negligible from portions of the closed loop that follow a path different from the straight-line path. The three or more transmitting sources can include a transmitting source that has a number of current-carrying wires forming a closed loop of a circuit, each of the number of current-carrying wires being at a known position and arranged along a straight-line path such that signals received at the receiver from the closed loop are negligible from portions of the closed loop that follow a path different from the straight-line paths; and the processing unit is arranged to process the signals based on a model of the number of current-carrying wires and their corresponding straight-line paths. The three or more transmitting sources can include at least three dipole transmitters. The three or more transmitting sources can include one or more transmitting sources located aboveground.

The control unit can be structured to be operable to generate at least one signal of the generated signals from a transmitting source aboveground or near ground, the signal having a low frequency to penetrate deeply underground such that the signal is measurable in an underground volume extending from a hundred feet to thousands feet in depth and from a hundred feet to thousands of feet across the depth. The control unit can be arranged to operate each of the transmitters at a frequency different from that of the other ones of the number of transmitters. The transmitters can also be operated sequentially.

In the second embodiment of an example system, the processing unit can be arranged to evaluate geometric identities using the angles and the known positions. The processing unit can be arranged to use a cosine theorem to evaluate geometric identities. The processing unit can be structured to operate to use gravity to provide a reference direction.

In various embodiments, an embodiment of a third example system can comprise: a receiver located in an underground formation; three or more magnetic dipoles located at known positions such that there are at least three distinct planes defined respectively by location of one of the three or more magnetic dipoles and the electric field at the receiver due to the respective magnetic dipole; a control unit arranged to control generation of signals from the three or more magnetic dipoles; and a processing unit arranged to determine an electric field at the receiver in response to generating the signals, and to determine the position of the receiver based on the known positions and the direction of the electric field. The processing unit can be located downhole. The processing unit can be realized by electronics integrated with the receiver, where the information concerning the known locations of the transmitting sensors is stored with the electronics along with instructions to process the signals. The processing unit can be realized by electronics disposed on the structure on which the receiver is disposed and separated from the receiver. The processing unit can be located downhole, which can allow for automated geosteering. Alternatively, the processing unit can be located at the surface, responsive to receiving the signals or data regarding the signals from the receiver.

In the third embodiment of an example system, the three or more magnetic dipoles are located aboveground or near ground. In an embodiment, an arrangement can include no more than two magnetic dipoles and the receiver in a plane.

Permutations of features of the methods discussed herein can be realized among the different methods. Permutations of features of the machine-readable storage devices discussed herein can be realized among the different machine-readable storage devices. Permutations of features of the systems discussed herein can be realized among the different systems.

Figure 23:
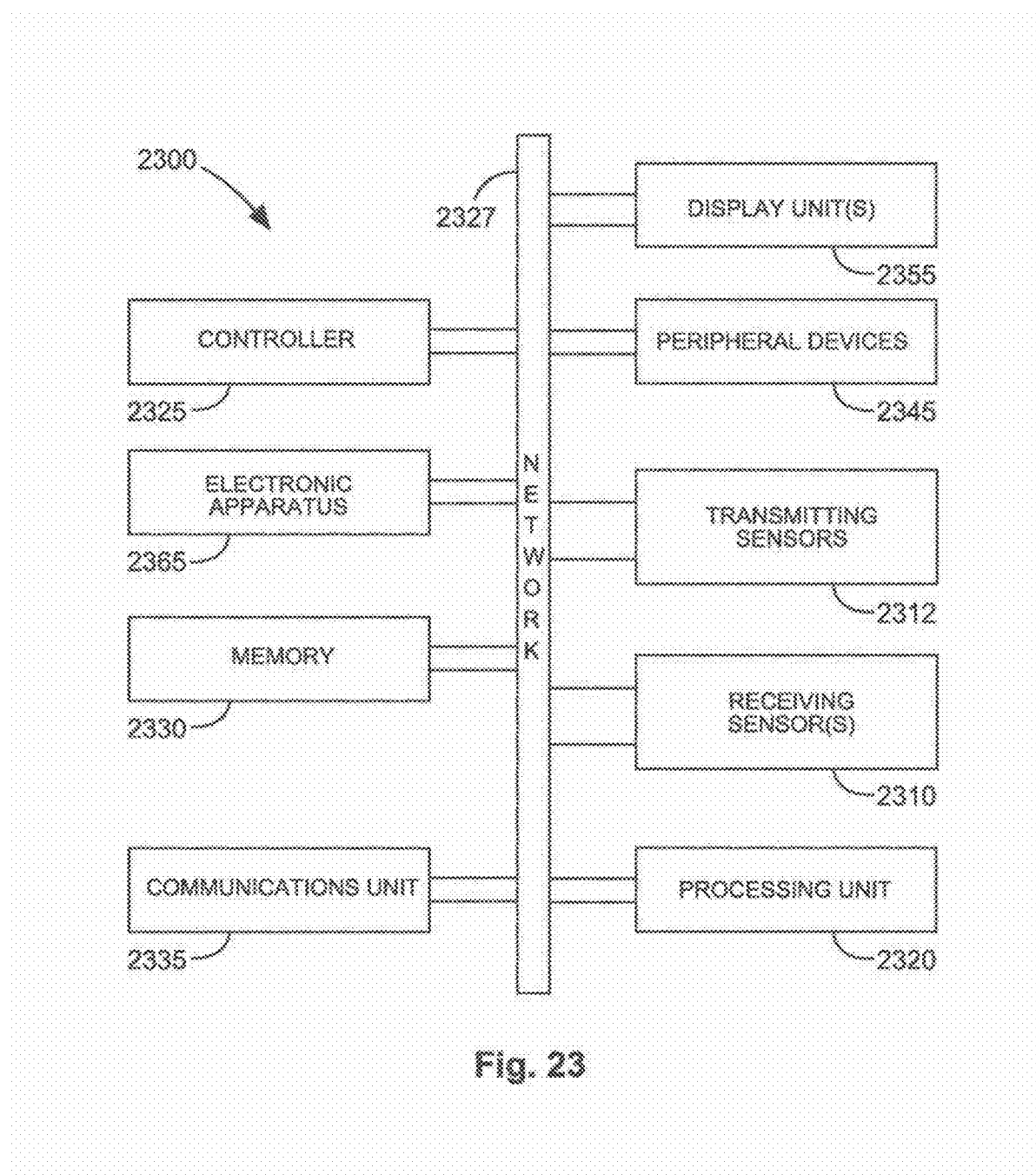
FIG. 23 depicts a block diagram of features of an example system to find a position in an underground formation, in accordance with various embodiments.

FIG. 23 depicts a block diagram of features of an example embodiment of a system 2300 operable to find a position in an underground formation. System 2300 configured with one or more transmitting sensors located at known positions and one or more receivers located in the underground formation. System 2300 includes an arrangement of transmitting sensors 2312 and receiving sensors 2310 that can be realized in a similar or identical manner to arrangements of sensors discussed herein. System 2300 can be configured to operate in accordance with the teachings herein.

System 2300 can include a controller 2325, a memory 2330, an electronic apparatus 2365, and a communications unit 2335. Controller 2325, memory 2330, and communications unit 2335 can be arranged to operate as a control unit and a processing unit to control operation of the arrangement of transmitting sensors 2312 and receiving sensors 2310 and to perform one or more processing operations on the signals collected to determine the position of one or more of the receiving sensors 2310, in a manner similar or identical to the procedures discussed herein. Such a processing unit can be realized as a processing unit 2320 that can be implemented as a single unit or distributed among the components of system 2300 including electronic apparatus 2365. Controller 2325 and memory 2330 can operate to control activation of transmitter sensors 2312 and selection of receiver sensors 2310 and to manage processing schemes in accordance with measurement procedures and signal processing as described herein. System 2300 can be structured to function in a manner similar to or identical to structures associated with transmitting arrangements and methods of processing a signal or signals from a receiving unit, whose position can be determined by the processing.

Communications unit 2335 can include downhole communications for appropriately located sensors. Such downhole communications can include a telemetry system. Communications unit 2335 may use combinations of wired communication technologies and wireless technologies at frequencies that do not interfere with on-going measurements. Communications unit 2335 can include interfaces to communicate with transmitting sensors distributed over a large spatial region.

System 2300 can include a network 2327, where network 2327 is operable over a network providing electrical conductivity among subsystems of system 2300 distributed over a large spatial region including surface located transmitters, underground transmitters, and receivers in underground formations. The surface located transmitters and the underground transmitters can be located at known locations with one or more receivers in communication to provide signals to processing unit to find the position of one or more receivers. Network 2327 can include an address bus, a data bus, and a control bus, each independently configured or in an integrated format. Network 2327 can be realized using a number of different communication mediums that allows for control and management of components and subsystems of system 2300 that can be distributed over a large spatial region. Use of network 2327 can be regulated by controller 2325.

In various embodiments, peripheral devices 2345 can include additional storage memory and/or other control devices that may operate in conjunction with controller 2325 and/or memory 2330. In an embodiment, controller 2325 is realized as a processor or a group of processors that may operate independently depending on an assigned function. Peripheral devices 2345 can be arranged with one or more displays 2355, as a distributed component on the surface, which can be used with instructions stored in memory 2330 to implement a user interface to monitor the operation of system 2300 and/or components distributed within system 2300. The user interface can be used to input operating parameter values such that system 2300 can operate autonomously substantially without user intervention.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:
receiving signals from a receiver in an underground formation in response to signals generated from three or more transmitting sources, each of the three or more transmitting sources located at a known position, at least one transmitting source of the three or more transmitting sources separated from and mounted on a structure different from at least one other transmitting source of the three or more transmitting sources;
using an inversion process to
(i) determine angles with respect to the transmitters relative to the receiver based on the received signals; and
(ii) determine a position of the receiver based on the angles and the known positions
wherein using the inversion process further comprises generating values of signals expected at the receiver from each of the three or more transmitting sources; comparing the values of the signals expected and the signals received by the receiver to (i) determine the angles with respect to the transmitters relative to the receiver based on the comparison; and (ii) determine the position of the receiver based on the comparison.

2. The method of claim 1, wherein the method includes controlling the three or more transmitting sources including a transmitting source that has a current-carrying wire of a closed loop of a circuit, the current-carrying wire being at a known position, the current-carrying wire arranged along a straight-line path such that signals received at the receiver from the closed loop are negligible from portions of the closed loop that follow a path different from the straight-line path.

3. The method of claim 1, wherein the method includes
controlling the three or more transmitting sources including a transmitting source that has a number of current-carrying wires forming a closed loop of a circuit, each of the number of current-carrying wires being at a known position and arranged along a straight-line path such that signals received at the receiver from the closed loop are negligible from portions of the closed loop that follow a path different from the straight-line paths; and
processing the signals based on a model of the number of current-carrying wires and their corresponding straight-line paths.

4. The method of claim 1, wherein the method includes controlling the three or more transmitting sources including at least three dipole transmitters.

5. The method of claim 1, wherein the three or more transmitting sources include one or more transmitting sources located aboveground.

6. The method of claim 1, wherein the method includes generating at least one signal of the generated signals from a transmitting source aboveground or near ground, the signal having a low frequency to penetrate deeply underground such that the signal is measurable in an underground volume extending from a hundred feet to thousands of feet in depth and from a hundred feet to thousands of feet across the depth.

7. The method of claim 1, wherein determining the position includes evaluating geometric identities using the angles determined via the inversion process and the known positions.

8. The method of claim 7, wherein evaluating geometric identities includes using a cosine theorem.

9. The method of claim 1, wherein the method includes using gravity to provide a reference.

10. The method of claim 1, wherein the method includes operating each of the transmitters at a frequency different from that of the other ones of the number of transmitters.

11. The method of claim 1, wherein the angles comprise an azimuth and elevation angle of the receiver.

12. The method of claim 1, wherein a drilling operation is performed based, at least in part, on the position and angle.

13. A machine-readable storage device having instructions stored thereon, which, when performed by a machine, cause the machine to perform operations to:
receive signals from a receiver in an underground formation in response to signals generated from three or more transmitting sources, each of the three or more transmitting sources located at a known position, at least one transmitting source of the three or more transmitting sources separated from and mounted on a structure different from at least one other transmitting source of the three or more transmitting sources;
using an inversion process to
(i) determine angles with respect to the transmitters relative to the receiver based on the received signals; and
(ii) determine a position of the receiver based on the angles and the known positions,
wherein using the inversion process further comprises generating values of signals expected at the receiver from each of the three or more transmitting sources; and comparing the values of the signals expected and the signals received by the receiver to (i) determine the angles with respect to the transmitters relative to the receiver based on the comparison; and (ii) determine the position of the receiver based on the comparison.

14. The machine-readable storage device of claim 13, wherein the instructions include instructions to control the three or more transmitting sources including a transmitting source that has a current-carrying wire of a closed loop of a circuit, the current-carrying wire being at a known position, the current-carrying wire arranged along a straight-line path such that signals received at the receiver from the closed loop are negligible from portions of the closed loop that follow a path different from the straight-line path.

15. The machine-readable storage device of claim 13, wherein the instructions include instructions to:
control the three or more transmitting sources including a transmitting source that has a number of current-carrying wires forming a closed loop of a circuit, each of the number of current-carrying wires being at a known position and arranged along a straight-line path such that signals received at the receiver from the closed loop are negligible from portions of the closed loop that follow a path different from the straight-line paths; and
process the signals based on a model of the number of current-carrying wires and their corresponding straight-line paths.

16. The machine-readable storage device of claim 13, wherein the instructions include instructions to control the three or more transmitting sources including at least three dipole transmitters.

17. The machine-readable storage device of claim 13, wherein the instructions include instructions to control the three or more transmitting sources including transmitting sources located aboveground.

18. The machine-readable storage device of claim 13, wherein the instructions include instructions to generate at least one signal of the generated signals from a transmitting source aboveground or near ground, the signal having a low frequency to penetrate deeply underground such that the signal is measurable in an underground volume extending from a hundred feet to thousands of feet in depth and from a hundred feet to thousands of feet across the depth.

19. The machine-readable storage device of claim 13, wherein operations to determine the position include evaluating geometric identities using the angles determined via the inversion process and the known positions.

20. The machine-readable storage device of claim 19, wherein evaluating geometric identities includes using a cosine theorem.

21. The machine-readable storage device of claim 13, wherein the operations include using gravity to provide a reference direction.

22. The machine-readable storage device of claim 13, wherein the operations include operating each of the transmitters at a frequency different from that of the other ones of the number of transmitters.

23. The machine-readable storage device of claim 13, wherein the operations include operating the transmitters sequentially with a single frequency.

24. The machine-readable storage device of claim 13, wherein the angles comprise an azimuth and elevation angle of the receiver.

25. The machine-readable storage device of claim 13, wherein a drilling operation is performed based, at least in part, on the position and angle.

26. A system comprising:
three or more transmitting sources, each of the transmitting sources located at a known position, at least one transmitting source of the three or more transmitting sources separated from and mounted on a structure different from at least one other transmitting source of the three or more transmitting sources;
a control unit arranged to control generation of signals from the three or more transmitting sources;
a receiver in an underground formation, the receiver operable to receive signals in response to the generation from the three or more transmitting sources;
a processing unit arranged to use an inversion process to (i) determine angles with respect to the transmitters relative to the receiver based on the received signals; and to (ii) determine a position of the receiver based on the angles and the known positions,
wherein using the inversion process further comprises generating values of signals expected at the receiver from each of the three or more transmitting sources; comparing the values of the signals expected and the signals received by the receiver to (i) determine the angles with respect to the transmitters relative to the receiver based on the comparison; and (ii) determine the position of the receiver based on the comparison.

27. The system of claim 26, wherein the three or more transmitting sources include a transmitting source that has a current-carrying wire of a closed loop of a circuit, the current-carrying wire being at a known position, the current-carrying wire arranged along a straight-line path such that signals received at the receiver from the closed loop are negligible from portions of the closed loop that follow a path different from the straight-line path.

28. The system of claim 26, wherein the three or more transmitting sources include a transmitting source that has a number of current-carrying wires forming a closed loop of a circuit, each of the number of current-carrying wires being at a known position and arranged along a straight-line path such that signals received at the receiver from the closed loop are negligible from portions of the closed loop that follow a path different from the straight-line paths; and the processing unit is arranged to process the signals based on a model of the number of current-carrying wires and their corresponding straight-line paths.

29. The system of claim 26, wherein the three or more transmitting sources include at least three dipole transmitters.

30. The system of claim 26, wherein the three or more transmitting sources include one or more transmitting sources located aboveground.

31. The system of claim 26, wherein the control unit is operable to generate at least one signal of the generated signals from a transmitting source aboveground or near ground, the signal having a low frequency to penetrate deeply underground such that the signal is measurable in an underground volume extending from a hundred feet to thousands of feet in depth and from a hundred feet to thousands of feet across the depth.

32. The system of claim 26, wherein the processing unit arranged to determine the position includes the processing unit arranged to evaluate geometric identities using the angles determined via the inversion process and the known positions.

33. The system of claim 26, wherein the processing unit arranged to evaluate geometric identities includes the processing unit arranged to use a cosine theorem.

34. The system of claim 26, wherein the processing unit includes the processing unit operable to use gravity to provide a reference direction.

35. The system of claim 26, wherein the control unit is arranged to operate each of the transmitters at a frequency different from that of the other ones of the number of transmitters.

36. The system of claim 26, wherein the angles comprise an azimuth and elevation angle of the receiver.

* * * * *